United States Patent
Kawasaki et al.

(10) Patent No.: US 9,128,649 B2
(45) Date of Patent: Sep. 8, 2015

(54) CONTROL APPARATUS, CONTROL METHOD, AND COMPUTER-READABLE RECORDING MEDIUM THAT OBTAIN POSITION DATA OF A WIRELESS TERMINAL

(71) Applicants: Satoshi Kawasaki, Kanagawa (JP); Satoshi Takano, Tokyo (JP); Shinji Aoki, Kanagawa (JP)

(72) Inventors: Satoshi Kawasaki, Kanagawa (JP); Satoshi Takano, Tokyo (JP); Shinji Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/025,003

(22) Filed: Sep. 12, 2013

(65) Prior Publication Data
US 2014/0078543 A1   Mar. 20, 2014

(30) Foreign Application Priority Data

Sep. 14, 2012 (JP) ................................ 2012-202650
Sep. 3, 2013 (JP) ................................ 2013-182175

(51) Int. Cl.
*G06F 3/12* (2006.01)
*H04W 4/02* (2009.01)

(52) U.S. Cl.
CPC ............ *G06F 3/1222* (2013.01); *G06F 3/1229* (2013.01); *G06F 3/1238* (2013.01); *G06F 3/1292* (2013.01); *H04W 4/02* (2013.01)

(58) Field of Classification Search
USPC ............................................. 358/1.14, 1.15
See application file for complete search history.

(56) References Cited

U.S. PATENT DOCUMENTS

| | | | |
|---|---|---|---|
| 7,948,437 B2 | 5/2011 | Torimoto et al. | |
| 8,280,398 B2 | 10/2012 | Ishii et al. | |
| 2007/0195364 A1* | 8/2007 | Umehara et al. | 358/1.15 |
| 2008/0034403 A1* | 2/2008 | Kakigi | 726/1 |
| 2012/0036132 A1* | 2/2012 | Doyle | 707/738 |
| 2013/0083359 A1* | 4/2013 | Ishigure | 358/1.15 |
| 2013/0250349 A1* | 9/2013 | Nakamura | 358/1.15 |

FOREIGN PATENT DOCUMENTS

| | | |
|---|---|---|
| JP | 2005-158007 | 6/2005 |
| JP | 4296302 | 7/2009 |
| WO | WO2005/086375 | 9/2005 |

OTHER PUBLICATIONS

U.S. Appl. No. 13/784,961, filed Mar. 5, 2013.
(Continued)

*Primary Examiner* — Qian Yang
(74) *Attorney, Agent, or Firm* — Oblon, McClelland, Maier & Neustadt, L.L.P.

(57) ABSTRACT

A control apparatus is disclosed that may communicate with a wireless terminal and an information processing device. The control apparatus includes a first obtaining unit configured to obtain position data of the wireless terminal; a second obtaining unit configured to obtain state information about the information processing device; a determining unit configured to make a determination that the position data obtained by the first obtaining unit indicates a predetermined location and the state information obtained by the second obtaining unit indicates a predetermined state; and a transmission unit configured to transmit to the information processing device a control signal causing the information processing device to execute predetermined processing in response to the determination made by the determining unit.

13 Claims, 24 Drawing Sheets

(56) References Cited

OTHER PUBLICATIONS

U.S. Appl. No. 13/795,383, filed Mar. 12, 2013.

Japan Aerospace Exploration Agency, "Quasi-Zenith Satellite System Navigation Service Interface Specification for QZSS (IS-QZSS) V1.4", Feb. 28, 2012, 222 pages.

* cited by examiner

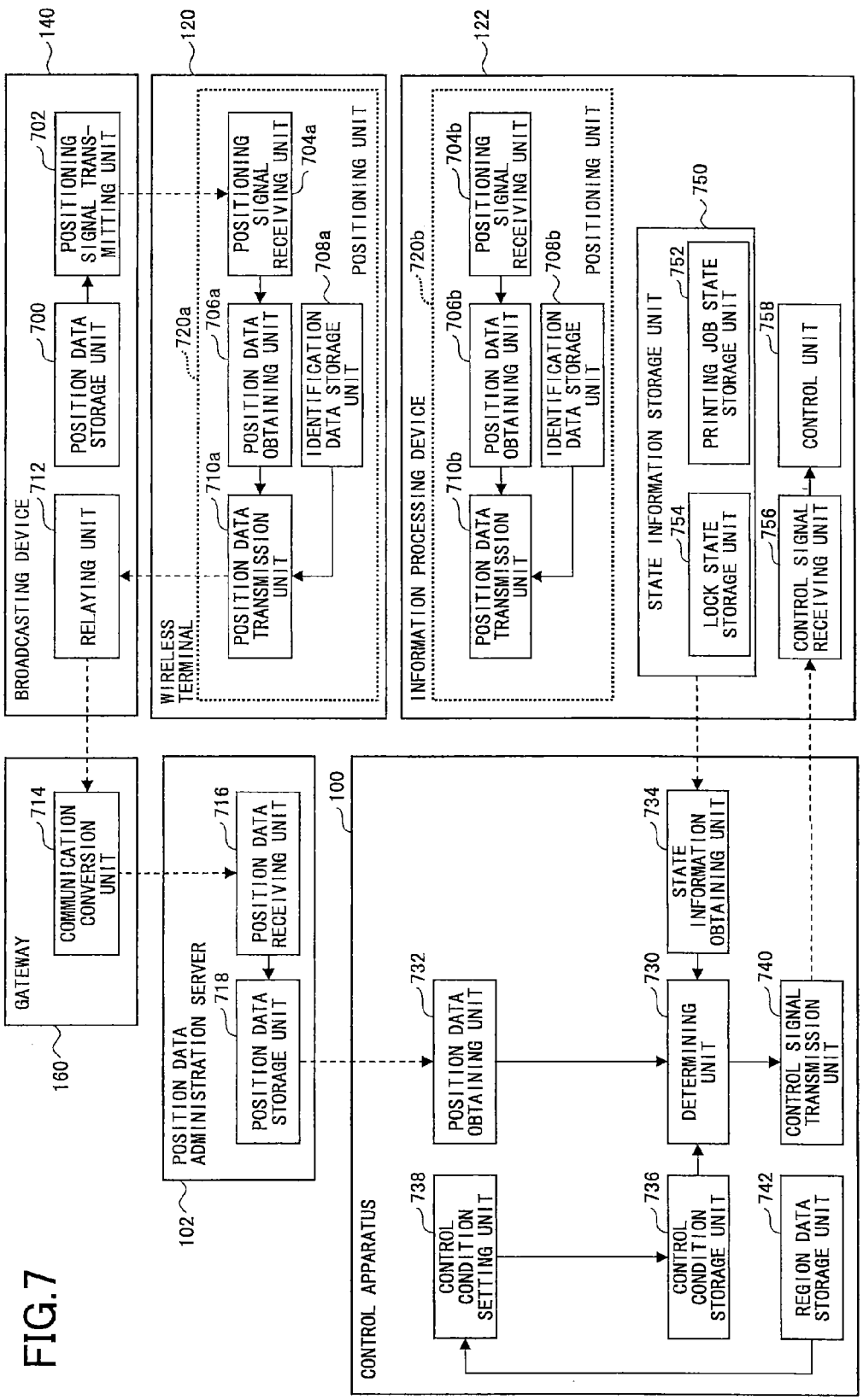

FIG.8A

| DATE AND TIME | LATITUDE | LONGITUDE | FLOOR |
|---|---|---|---|
| 2012/7/17 10:00:00 | 35.66635 | 139.76525 | 4 |
| 2012/7/17 10:00:05 | 35.66635 | 139.76525 | 4 |
| 2012/7/17 10:00:10 | 35.66635 | 139.76520 | 4 |
| 2012/7/17 10:00:15 | 35.66640 | 139.76520 | 4 |
| 2012/7/17 10:00:20 | 35.66645 | 139.76520 | 4 |

WIRELESS TERMINAL 120

FIG.8B

| DATE AND TIME | LATITUDE | LONGITUDE | FLOOR |
|---|---|---|---|
| 2012/7/17 10:00:00 | 35.66635 | 139.76525 | 4 |
| 2012/7/17 10:00:05 | 35.66635 | 139.76525 | 4 |
| 2012/7/17 10:00:10 | 35.66635 | 139.76525 | 4 |
| 2012/7/17 10:00:15 | 35.66635 | 139.76525 | 4 |
| 2012/7/17 10:00:20 | 35.66635 | 139.76525 | 4 |
| : | : | : | : |

INFORMATION PROCESSING DEVICE 122

FIG.9A

| DATE AND TIME | LATITUDE | LONGITUDE | FLOOR |
|---|---|---|---|
| : | : | : | : |
| 2012/7/17 10:05:00 | 35.66630 | 139.76530 | 4 |
| 2012/7/17 10:05:05 | 35.66635 | 139.76530 | 4 |
| 2012/7/17 10:05:10 | 35.66640 | 139.76530 | 4 |
| 2012/7/17 10:05:15 | 35.66645 | 139.76530 | 4 |
| 2012/7/17 10:05:20 | 35.66645 | 139.76525 | 4 |
| 2012/7/17 10:05:25 | 35.66645 | 139.76520 | 4 |
| 2012/7/17 10:05:30 | 35.66640 | 139.76520 | 4 |

~900

WIRELESS TERMINAL 120

FIG.9B

| DATE AND TIME | LATITUDE | LONGITUDE | FLOOR |
|---|---|---|---|
| : | : | : | : |
| 2012/7/17 10:05:00 | 35.66635 | 139.76525 | 4 |
| 2012/7/17 10:05:05 | 35.66635 | 139.76525 | 4 |
| 2012/7/17 10:05:10 | 35.66635 | 139.76525 | 4 |
| 2012/7/17 10:05:15 | 35.66635 | 139.76525 | 4 |
| 2012/7/17 10:05:20 | 35.66635 | 139.76525 | 4 |
| 2012/7/17 10:05:25 | 35.66635 | 139.76525 | 4 |
| 2012/7/17 10:05:30 | 35.66635 | 139.76525 | 4 |

INFORMATION PROCESSING DEVICE 122

FIG.10

| BROADCASTING DEVICE IDENTIFIER | LATITUDE | LONGITUDE | FLOOR |
|---|---|---|---|
| C1 | 35.66630 | 139.76520 | 4 |
| C2 | 35.66630 | 139.76525 | 4 |
| C3 | 35.66630 | 139.76530 | 4 |
| C4 | 35.66635 | 139.76520 | 4 |
| C5 | 35.66635 | 139.76525 | 4 |
| C6 | 35.66635 | 139.76530 | 4 |
| C7 | 35.66640 | 139.76520 | 4 |
| C8 | 35.66640 | 139.76525 | 4 |
| C9 | 35.66640 | 139.76530 | 4 |
| C10 | 35.66645 | 139.76520 | 4 |
| ⋮ | ⋮ | ⋮ | ⋮ |

FIG.11

| NUMBER | CONDITION OF WIRELESS TERMINAL LOCATION | CONDITION OF INFORMATION PROCESSING DEVICE STATE | HOW TO CONTROL |
|---|---|---|---|
| 1 | C10 | LOCKED | UNLOCK |
| 2 | C10 | UNLOCKED | LOCK |
| 3 | C1, C4, C5, C7, C8 | STANDBY FOR EXECUTION OF USER'S PRINTING JOB | EXECUTION FOR THE PRINTING JOB |
| 4 | IDENTICAL TO INFORMATION PROCESSING DEVICE (002673abcd02) | SYSTEM STANDBY | RESUME FROM SYSTEM STANDBY |
| : | : | : | : |

FIG.12A

```
<config>

<!-- NUMBER -->
<entry id="1">
<id number="1" />
  <!- POSITION DATA OF WIRELESS TERMINAL -->
  <condition_location device_id="c10" />
  <!- STATE OF INFORMATION PROCESSING DEVICE (LOCKED) -->
  <condition_state name="locked />
  <!- HOW TO CONTROL(UNLOCK) -->
  <action name="unlock" />
</entry>

<enrty id="2">
  <condition_location device_id="c10" />
  <!- STATE OF INFORMATION PROCESSING DEVICE (UNLOCKED) -->
  <condition_state name="unlocked" />
  <!- HOW TO CONTROL(LOCK) -->
  <action name="lock" />
</entry>

```
...
<entry id="3">
<condition_location device_id="C1" />
<condition_location device_id="C4" />
<condition_location device_id="C5" />
<condition_location device_id="C7" />
<condition_location device_id="C8" />                          } 1200
<!-- STATE OF INFORMATION PROCESSING DEVICE (STANDBY FOR EXECUTION OF PRINTING JOB) -->
<condition_state name="spooling" />
<!-- STATE OF INFORMATION PROCESSING DEVICE(EXECUTE THE PRINTING JOB) -->
<action name="print" />
</entry>
<entry id="4">
<condition_location device_id="002673abcdef02" />
<!-- STATE OF INFORMATION PROCESSING DEVICE (SYSTEM STANDBY) -->
<condition_state="sleep" />
<!-- STATE OF INFORMATION PROCESSING DEVICE (RESUME) -->
<action name="wakeup" />
</control>
</config>
```

<entry id="3">
  <condition_location area="yes" device_id="C5" latitude="0.00005"
longtitude="0.00005" />
  <condition_state name="spooling" />
  <action name="print" />
</entry>

| DATE AND TIME | LATITUDE | LONGITUDE | FLOOR |
|---|---|---|---|
| : | : | : | : |
| 2012/7/17 10:05:00 | 35.66635 | 139.76525 | 4 |
| 2012/7/17 10:05:05 | 35.66635 | 139.76525 | 4 |
| 2012/7/17 10:05:10 | 35.66635 | 139.76525 | 4 |
| 2012/7/17 10:05:15 | 35.66635 | 139.76525 | 4 |
| 2012/7/17 10:05:20 | 35.66635 | 139.76525 | 4 |
| 2012/7/17 10:05:25 | 35.66635 | 139.76525 | 4 |
| 2012/7/17 10:05:30 | 35.66635 | 139.76525 | 4 |

COMMUNICATION TERMINAL 122B
(INFORMATION PROCESSING DEVICE 122A)

CONTROL APPARATUS, CONTROL METHOD, AND COMPUTER-READABLE RECORDING MEDIUM THAT OBTAIN POSITION DATA OF A WIRELESS TERMINAL

BACKGROUND OF THE INVENTION

1. Field of the Invention

An aspect of this disclosure is related to a control apparatus, a control method, and a computer-readable recording medium.

2. Description of the Related Art

Generally, a user who intends to use an information processing device installed in an office environment may use the information processing device by logging in the information processing device using an ID assigned to the user and a password. When the user wants to leave the place where the information processing device the user is using is installed temporarily, the user has to lock or log off the information processing device so that other users cannot wrongfully access the information processing device with the user's account.

When the user instructs the information processing device to execute a printing job through his information processing terminal, the information processing device receives and executes the printing job. As a result, printed paper is output to an output tray of the information processing device.

When the user leaves the place where the information processing device is installed without locking it or fails to collect the printed paper after instructing the information processing device to execute the printing job, the other users are likely to operate the device or obtain information incorrectly. Thus, a technique is desired to control the information processing device so that processing is executed depending on a location where the user is or a condition of the information processing device.

Patent Document 1 and Non-patent Document 1 disclose a method to obtain position data of users by allowing wireless terminals of the users to receive indoor positioning signals. However, no method exists to control the information processing device depending on the users' location or the condition of the information processing device.

An aspect of this disclosure aims to control the information processing device depending on the user's location and the condition of the information processing device.

SUMMARY OF THE INVENTION

In an embodiment of this invention, there is provided a control apparatus, which may communicate with a wireless terminal and an information processing device, the control apparatus including
 a first obtaining unit configured to obtain position data of the wireless terminal;
 a second obtaining unit configured to obtain state information about the information processing device;
 a determining unit configured to make a determination that the position data obtained by the first obtaining unit indicates a predetermined location and the state information obtained by the second obtaining unit indicates a predetermined state; and
 a transmission unit configured to transmit to the information processing device a control signal causing the information processing device to execute predetermined processing in response to the determination made by the determining unit.

According to another embodiment of this invention, there is provided a control method executed on a control apparatus, which may communicate with a wireless terminal and an information processing device, the control method including
 obtaining position data of the wireless terminal;
 obtaining state information about the information processing device;
 making a determination that the obtained position data indicates a predetermined location and the obtained state information obtained indicates a predetermined state; and
 transmitting to the information processing device a control signal causing the information processing device to execute predetermined processing in response to the determination.

According to another embodiment of this invention, there is provided a non-transitory computer-readable recording medium having stored therein a control program for a control apparatus which may communicate with a wireless terminal and an information processing device, the control program causing the control apparatus to execute a method, the method including
 obtaining position data of the wireless terminal;
 obtaining state information about the information processing device;
 making a determination that the obtained position data indicates a predetermined location and the obtained state information obtained indicates a predetermined state; and
 transmitting to the information processing device a control signal causing the information processing device to execute predetermined processing in response to the determination.

According to an embodiment of this invention, the information processing device may be controlled depending on the user's location and the condition of the information processing device.

BRIEF DESCRIPTION OF THE DRAWINGS

Other objects and further features of embodiments may become apparent from the following detailed description when read in conjunction with the accompanying drawings, in which:

FIG. 7 is a block diagram illustrating exemplary functional configurations of a control apparatus, a wireless terminal, an information processing device, a broadcasting device, a gateway, and a position data administration server according to an embodiment of this invention;

FIG. 8A is a position data administration table for storing position data of a wireless terminal according to an embodiment of this invention;

FIG. 8B is a position data administration table for storing position data of an information processing device according to an embodiment of this invention;

FIG. 9A is a position data administration table for storing position data of a wireless terminal according to an embodiment of this invention;

FIG. 9B is a position data administration table for storing position data of an information processing device according to an embodiment of this invention;

FIG. 10 is a table for storing position data indicating locations where broadcasting devices are installed according to an embodiment of this invention;

FIG. 11 is a condition table for defining conditions used by a control apparatus according to an embodiment of this invention to transmit a control signal to an information processing device;

FIG. 12A is a drawing illustrating a configuration file defining control conditions used by a control apparatus according to an embodiment of this invention;

FIG. 12B is a drawing illustrating a configuration file defining control conditions used by a control apparatus according to an embodiment of this invention;

FIG. 13 is a drawing illustrating a configuration file defining control conditions used by a control apparatus according to an embodiment of this invention;

FIG. 20 is a position data administration table for storing position data of a wireless terminal according to an embodiment of this invention;

DESCRIPTION OF THE PREFERRED EMBODIMENTS

Figure 1:
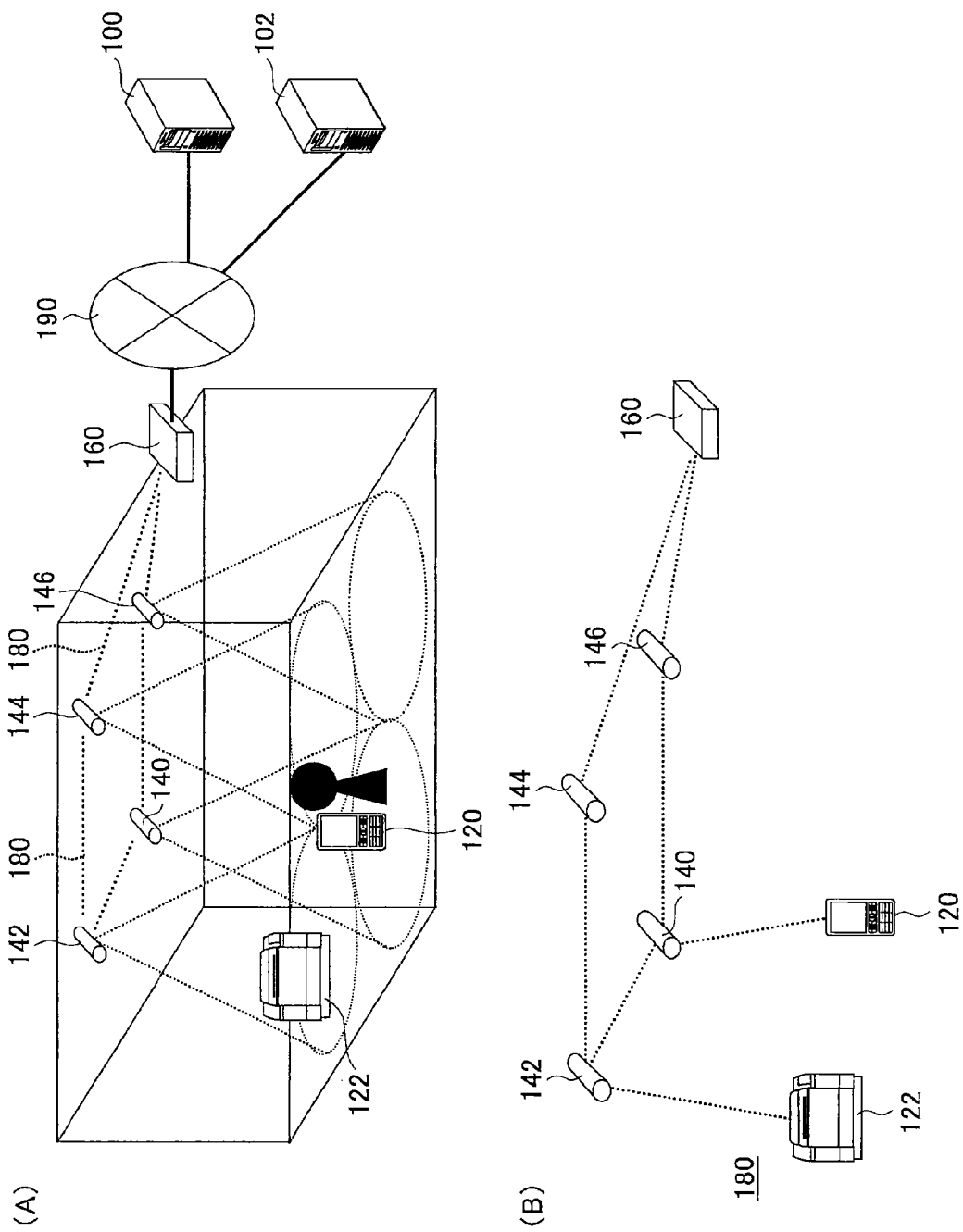
FIG. 1 is a drawing illustrating an overview of a system including a control apparatus according to an embodiment of this invention.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

1. System Overview
2. Hardware Configurations
2.1 Control Apparatus
2.2 Wireless Terminal/Information Processing Device
2.3 Broadcasting Device
2.4 Gateway
3. Functions
3.1 Obtaining Position Data
3.2 Transmitting Control Signals
4. Process Flow
5. Variants (1. System Overview)

Figure 2:
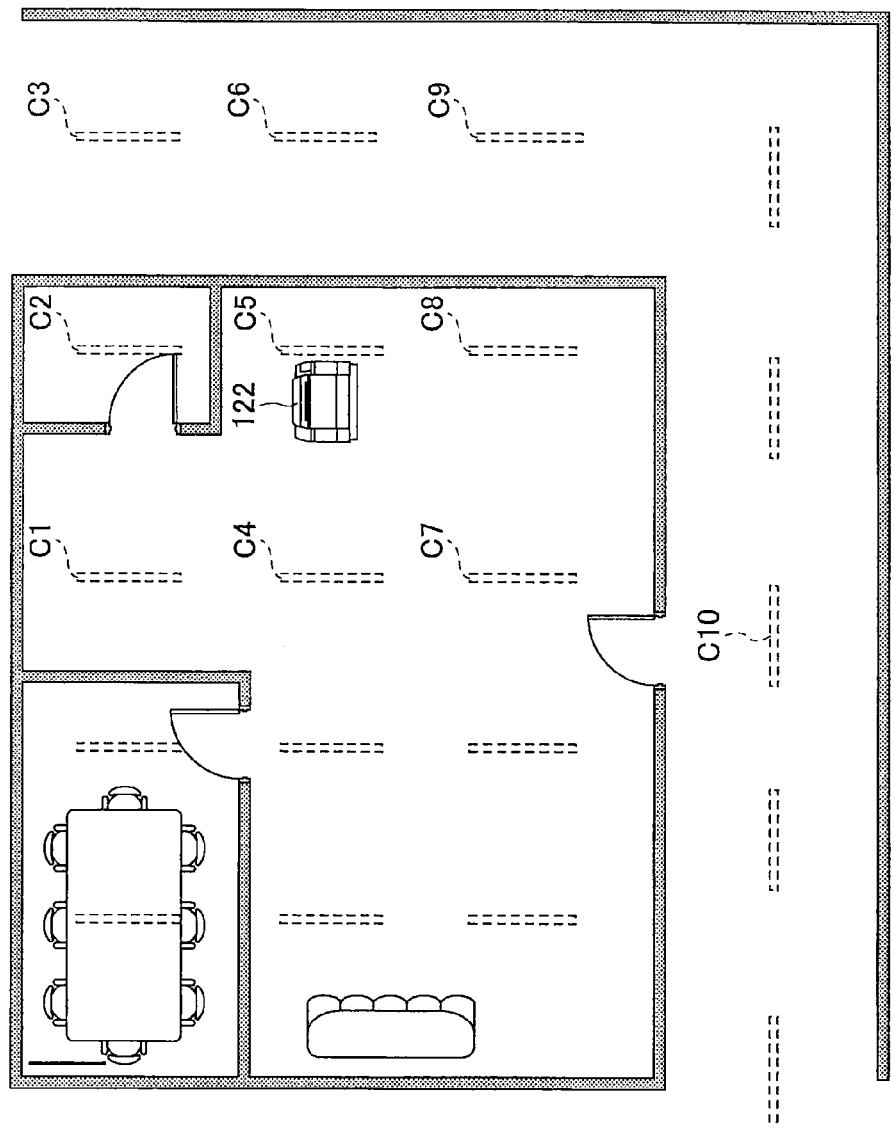
FIG. 2 is a drawing illustrating an overview of a system including a control apparatus according to an embodiment of this invention.

With reference to FIGS. 1, 2, an overview of a system is explained, which includes a control apparatus 100 according to an embodiment of this invention. FIG. 1 shows that a wireless terminal 120 which is carried by a user and an information processing device 122 which operates according to an instruction from the user are placed in an environment. The wireless terminal 120 and the information processing device 122 may receive positioning signals broadcast from broadcasting devices 140-146 installed on the ceiling of a room and obtain position data indicating their locations. The positioning signal may be formed according to IMES standard. The positioning signal includes latitude, longitude, and floor information indicating a location where the broadcasting device is installed. The wireless terminal 120 and the information processing device 122 may transmit the position data obtained via the positioning signal to a position data administration server 102 via a personal area network (PAN) 180 formed with the broadcasting devices 140-146 (and a gateway 160 stated later). The PAN 180 is formed according to ZigBee™ which is a protocol for short range radio communications. FIG. 1(B) shows the PAN 180 which is extracted from FIG. 1(A). The PAN 180 is described in detail later. The control apparatus 100 may access the position data of the wireless terminal 120 and the information processing device 122 stored in the position data administration server 102 at any time. When the position data of the wireless terminal 120 and the information processing device 122 and state information which may be obtained from the information processing device 122 meet a predetermined condition, the control apparatus 100 may transmit a control signal to the information processing device 122.

With reference to FIG. 2, a process for transmitting the control signal based on the condition is explained, which is executed by the control apparatus 100. FIG. 2 shows an overhead view of an actual office environment which indicates an access aisle, rooms, doors, chairs, a table, etc. Rectangles drawn by dashed lines indicate the broadcasting devices 140-146 which are installed in the environment and broadcast the positioning signal. The broadcasting device may be incorporated in or with a lighting unit such as a LED fluorescent tube. FIG. 2 shows an image forming device as an example of the information processing device 122, which may receive and execute a printing job issued by the information processing terminal 120 of the user. The image forming device 122 is configured to refrain from executing the printing job (or spool the printing job) until the image forming device 122 receives the control signal in a predetermined format from the control apparatus 100. When the following conditions are met, the control apparatus 100 may transmit the control signal to the image forming device 122 to execute the printing job.

The position data of the wireless terminal 120 obtained from the position data administration server 102 is identical to or neighbors with the position data of the image forming device (an example of "neighbor" position data is "C5" versus "C1", "C4", or "C8" shown in FIG. 2)

The wireless terminal 120 carried by the user has issues the printing job

The control signal may be transmitted to the information processing device 122 via the network 180 or a network 190 (e.g. a wired LAN or a wireless LAN). As a result, the printing job is executed when the user, who carries the wireless terminal 120 and has instructed the image forming device 122 to execute the printing job, approaches the location where the image forming device 122 is installed. That reduces a risk that another person obtains and reads the printed paper even if the user fails to collect the printed paper since the print job is not executed before the conditions are met.

Next, with reference to FIG. 1(B), the configuration is explained in which the wireless terminal 120 and the information processing device 122 transmit the obtained position data to the position data administration server 102 via the network 180 employing the short range wireless communications. The network 180 is the PAN formed by the wireless terminal 120, the information processing device 122, broadcasting devices 140-146, and the gateway 160. The broadcasting devices 140-146 are configured to transmit the indoor positioning signal (e.g. a positioning signal according to IMES standard).

The wireless terminal 120 and the information processing device 122 which receive the positioning signal from the broadcasting devices 140-146 transmit the received position data and respective identification data (e.g. a network address) to the broadcasting devices 140-146 via the wireless communications (e.g. ZigBee™). The broadcasting devices 140-146 forming the PAN relay the data transmitted by the wireless terminal 120 and the information processing device 122 to the gateway 160. When the network 180 is formed according to ZigBee™, the broadcasting devices 140-146 operate as ZigBee Routers, which have a function to relay data between other ZigBee devices).

The gateway 160 interconnects the networks 180, 190, and relays data transmitted from the network 180 to the network 190. When the network 180 is formed according to ZigBee™ and the network 190 is a LAN formed according to IEEE 802.3, the gateway 168 may convert the data between the networks. In addition, the gateway 160 has a function to manage the network 180.

As shown in FIG. 1(B), the wireless terminal 120 and the information processing device 122 are connected to the network 180. When the network 180 is formed according to ZigBee™, the wireless terminal 120 and the information processing device 122 operate as ZigBee End Devices (i.e. devices connected to ZigBee Router or ZigBee Cordinator with no relay function). On the other hand, the gateway 160 operates as the ZigBee Cordinator (a sole device in a ZigBee network to create and manage the network) required to form and manage the network 180.

The position data administration server 102 obtains and stores the position data transmitted by the wireless terminal 120 and the information processing device 122 via the networks 180, 190.

With the above stated configuration, the control apparatus 100 may transmit the control signal to allow the information processing device 122 to execute processing when a relationship about locations of the wireless terminal 120 and the information processing device 122 and the state information about the information processing device 122 meet the predetermined conditions.

(2. Hardware Configurations)

Next, with reference to FIGS. 3-6, hardware configurations are explained for the control apparatus 100, the wireless terminal 120 (or the information processing device 122), the broadcasting device 140, and the gateway 160.

(2.1 Control Apparatus)

Figure 3:
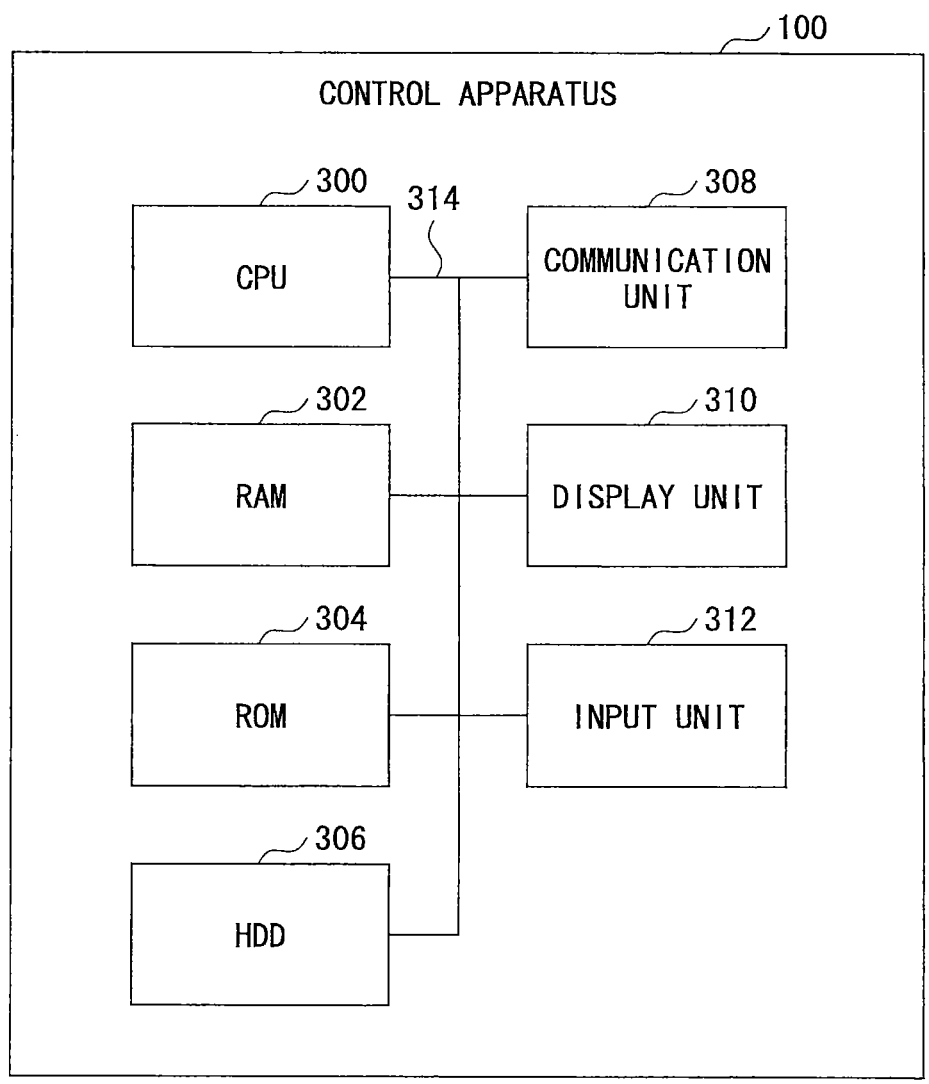
FIG. 3 is a block diagram illustrating an exemplary hardware configuration of a control apparatus according to an embodiment of this invention.

FIG. 3 shows an exemplary hardware configuration of the control apparatus 100 according to an embodiment of this invention. The control apparatus 100 includes a CPU 300, a RAM 302, a ROM 304, a HDD 306, a communication device 308, a display device 310, an input device 312, and a bus 314.

The CPU 300 executes programs controlling the control apparatus 100. The RAM 302 may operate as a working memory for the CPU 300. The ROM 304 stores system programs for the control apparatus 100. The HDD 306 stores an OS or application programs and data. The communication device 308, including a LAN interface, may communicate with an external device.

The display device 310, such as a liquid crystal display, may provide visual information to the user. The input device 312, such as a keyboard or a mouse, may accept input from the user. The bus 314 interconnects the above devices electrically.

With the above stated configuration, the control apparatus 100 according to an embodiment of this invention may transmit the control signal allowing the information processing device to execute processing when the predetermined conditions are met.

The display unit 310 and the input unit 312 may be omitted.

(2.2 Wireless Terminal)

Figure 4:
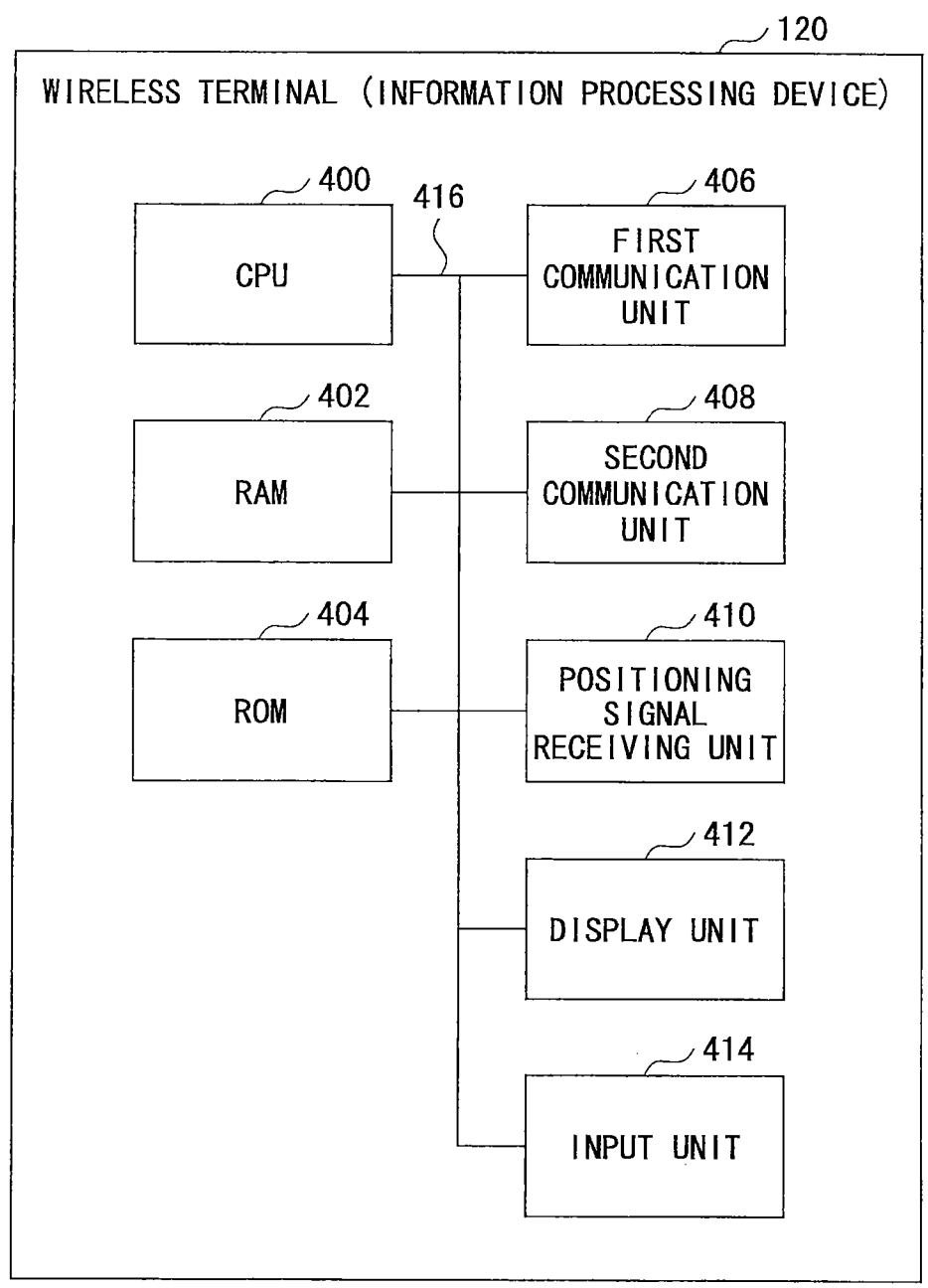
FIG. 4 is a block diagram illustrating an exemplary hardware configuration of a wireless terminal and an information processing device according to an embodiment of this invention.

FIG. 4 shows an exemplary hardware configuration of the wireless terminal 120 or the information processing device 122 according to an embodiment of this invention. The wireless terminal 120 or the information processing device 122 includes a CPU 400, a RAM 402, a ROM 404, a first communication device 406, a second communication device 408, a positioning signal receiving device 410, a display device 412, an input device 414, and a bus 416.

The CPU 400 executes programs controlling the wireless terminal 120 or the information processing device 122. The RAM 402 may operate as a working memory for the CPU 400. The ROM 404 stores programs executed by the CPU 400 as well as data required to execute the programs. The first communication device 406 may communicate with an external device according to a short range wireless communication method such as ZigBee™. The second communication device 408 may communicate with an external device via a wireless LAN conforming to IEEE 802.11 standard. The positioning signal receiving device 410 may receive a positional signal whose frame format is formed according to IMES, which is transmitted by the broadcasting device 140. The display device 412, such as a liquid crystal display, may provide visual information to the user. The input device 414, such as a keyboard, a mouse, or a touch panel, may accept input from the user. The bus 416 interconnects the above devices electrically.

With the above configuration, the wireless terminal 120 or the information processing device 122 according to an embodiment of this invention may obtain the position data using the positioning signal broadcast by the broadcasting device 140. Also, the wireless terminal 120 or the information processing device 122 according to an embodiment of this invention may transmit the position data to the position data administration server 102. The information processing device 122 may execute the predetermined processing in response to the control signal from the control apparatus 100.

Alternatively, the wireless terminal 120 may have a communication device as the second communication device 408, which may communicate with a 3G network for cell phones. The wireless terminal 120 may have both communication devices for communicating with the wireless LAN and the 3G network.

In addition, the information processing device 122 may have a communication device as the second communication unit 408, which may communicate with a wired LAN.

The information processing device 122 may have further hardware. For example, the information processing device 122 may have an output device for receiving a printing job from the wireless terminal 120 and performing a printing process. In this way, any further hardware may be added to the information processing device 122 depending on a function of the information processing device 122.

(2.3 Broadcasting Device)

Figure 5:
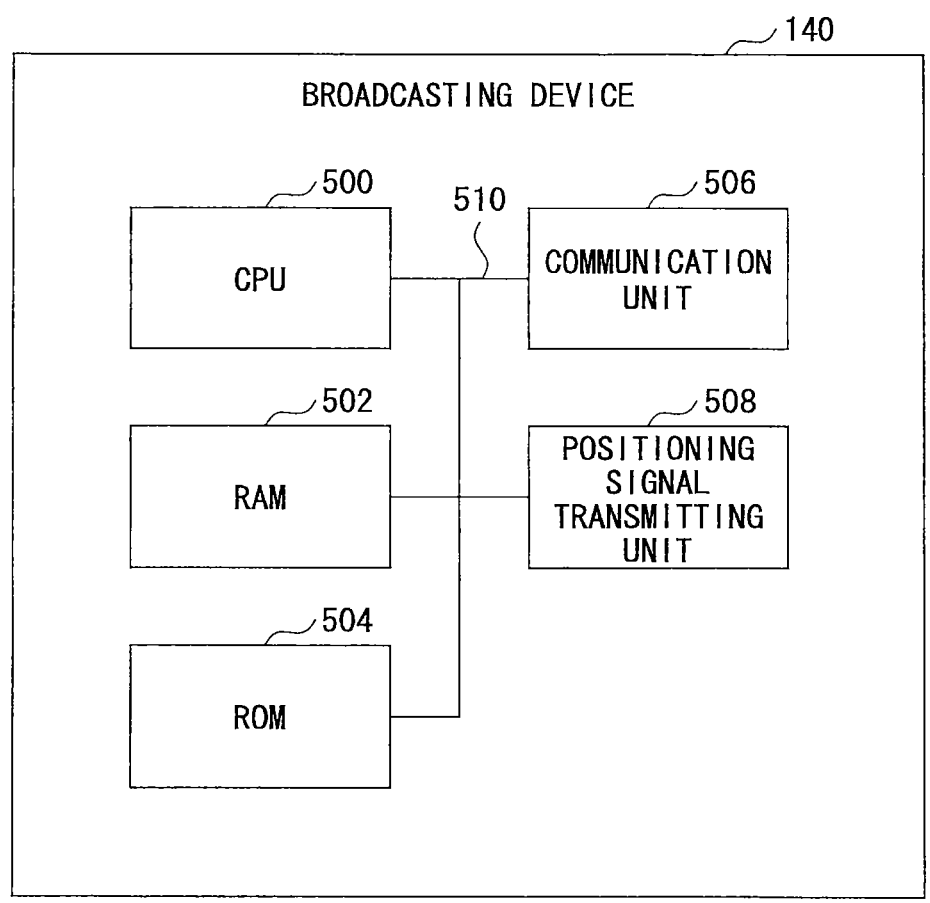
FIG. 5 is a block diagram illustrating an exemplary hardware configuration of a broadcasting device according to an embodiment of this invention.

FIG. 5 shows an exemplary hardware configuration of the broadcasting devices 140-146 (the following explanation refers to only the broadcasting device 140) according to an embodiment of this invention. The broadcasting device 140 includes a CPU 500, a RAM 502, a ROM 504, a communication unit 506, a positioning signal transmitting unit 508, and a bus 510.

The CPU 500 executes programs controlling the broadcasting device 140. The RAM 502 may operate as a working memory for the CPU 500. The ROM 504 stores programs executed by the CPU 500 and data required by the programs. The communication unit 506 is a device to communicate with an external device according to a short range wireless communication technology such as ZigBee™. The positioning signal transmitting unit 508 is a device to transmit the positioning signal used by the wireless terminal 120 for the positioning. The positioning signal transmitting unit 508 may transmit the positioning signal including a frame format defined in IMES standard, for example.

In particular, the positioning signal transmitting unit 508 modulates a 1.5754 GHz carrier wave using data including the frame structure defined in IMES standard, and emits the modulated wave with an antenna. The bus 510 interconnects the above units electrically.

With the above stated configuration, the broadcasting device 140 according to an embodiment of this invention may transmit the positioning signal required by the wireless terminal 120 and the information processing device 122 for the positioning. Also the broadcasting device 140 may relay data between the wireless terminal 120, the information processing device 122, and the gateway 160.

(2.4 Gateway)

Figure 6:
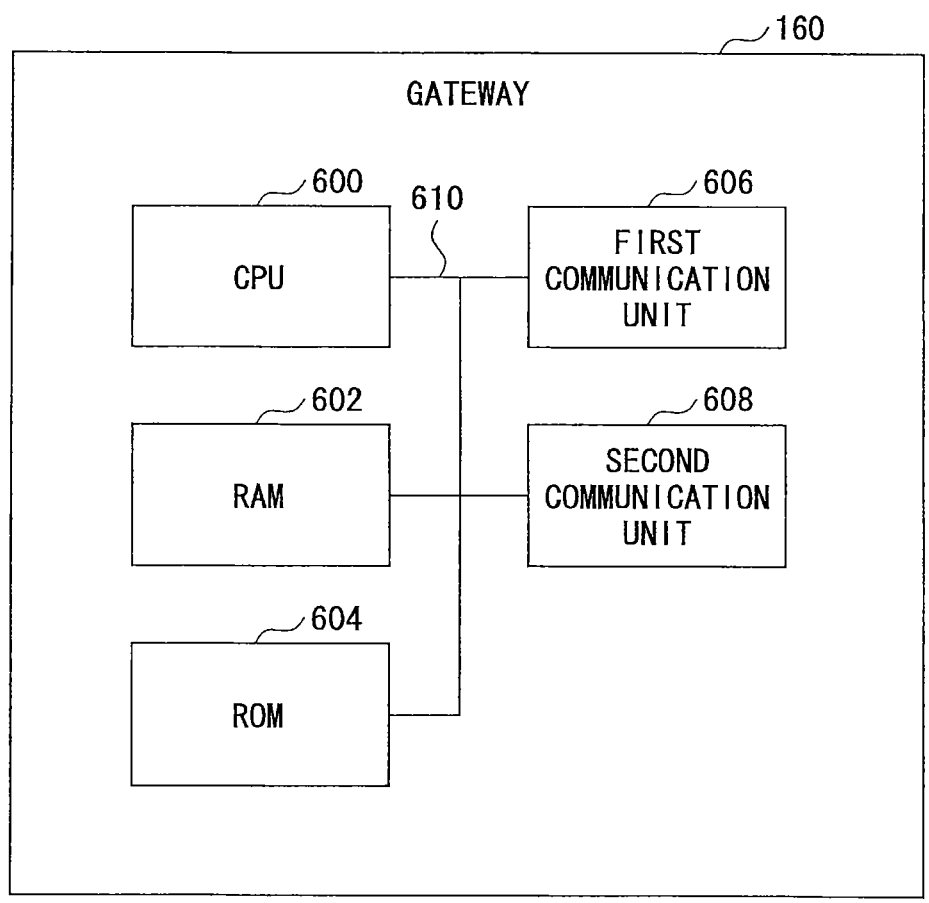
FIG. 6 is a block diagram illustrating an exemplary hardware configuration of a gateway according to an embodiment of this invention.

FIG. 6 shows an exemplary hardware configuration of the gateway 160 according to an embodiment of this invention. The gateway 160 includes a CPU 600, a RAM 602, a ROM 604, a first communication unit 606, a second communication unit 608, and a bus 610.

The CPU 600 executes programs controlling the gateway 160. The RAM 602 may operate as a working memory for the CPU 600. The ROM 604 stores programs executed by the CPU 600 and data required by the programs. The first communication unit 606 is a device to communicate with an external device according to a short range wireless communication technology such as ZigBee™. The second communication unit 608 is a device to communicate with an external device. The communication unit 608 may include an interface to connect with the LAN 190 according to IEEE 802.3 standard. The bus 610 interconnects the above units electrically.

With the above stated configuration, the gateway 160 according to an embodiment of this invention may manage the network 180 with short range wireless communications, which includes the broadcasting devices 140-146, the wireless terminal 120, and the information processing device 122. In addition, the gateway 160 may interconnect the networks 180, 190.

(3. Functions)

With reference to FIG. 7, the functional block diagram is explained for the control apparatus 100, the wireless terminal 120, the information processing device 122, the broadcasting device 140, the gateway 160 and the position data administration server 102. The block diagram shown in the FIG. 7 includes some of various elements of the above devices, which are especially related to the description of the embodiment. In the FIG. 7, data flows are expressed by arrows drawn between units. In particular, the data flows between devices are expressed by the arrows with dashed lines. Functions for "Obtaining Position Data" and "Transmitting Control Signals", which are provided by the configuration, are explained separately below.

(3.1 Obtaining Position Data)

First, the function to obtain and administrate the position data of the wireless terminal 120 and the information processing device 122 is explained. Here, by way of example, only an explanation to obtain the position data of the wireless terminal 120 is done. As stated above, the position data of the wireless terminal 120 is obtained by the wireless terminal 120 via the positioning signal broadcast by the broadcasting device 140. Here, the explanation is done on condition that the positioning signal is formed according to the IMES standard. The wireless terminal 120 may transmit the obtained position data to the position data administration server 102 via the network 180.

The broadcasting device 140 includes a position data storage unit 700 and a position signal transmitting unit 702 (a relaying unit 712 is discussed later).

The position data storage unit 700 stores the position data indicating a location where the broadcasting device 140 is installed. The positioning signal may include latitude, longitude, and floor information. The position data for the broadcasting device 140 is set by an administrator of the broadcasting device 140 in advance. The position data of the installed broadcasting device may be managed with a table shown in FIG. 10. The table includes ID for each broadcasting device and the position data.

The table may be stored in the control apparatus 100. The positioning signal transmitting unit 702 may create the positioning signal including the position data stored in the position data storage unit 700 and transmit the positioning signal to the wireless terminal 120. The positioning signal may be formed using a frame structure defined by the IMES standard.

The wireless terminal 120 according to an embodiment of the invention includes a position signal receiving unit 704a, a position data obtaining unit 706a, an identification storage unit 708a, and a position data transmission unit 710a. Here, these units included in the wireless terminal 120 are hereinafter collectively called a positioning unit 720a. As shown in FIG. 7, a positioning unit 720b, which functions in common with the positioning unit 720a, is included in the information processing device 122.

The positioning signal receiving unit 704a may receive the positioning signal broadcast by the broadcasting device 140. The positioning signal receiving unit 704a transfers the received positioning signal to the position data obtaining unit 706a.

The position data obtaining unit 706a obtains the position data from the positioning signal which is received by the positioning signal receiving unit 704a and formed according to the IMES standard. The position data includes latitude, longitude, and floor information. The position data obtaining unit 706a conveys the obtained position data to the position data transmission unit 710a.

The identification data storage unit 708a may store the identification data of the wireless terminal 120. The identification data may be expressed by a MAC address uniquely assigned to the wireless terminal 120.

The position data transmission unit 710a may transmit to the broadcasting device 140 the position data received from the position data obtaining unit 706a and the identification data stored in the identification data storage unit 708a. Here, the position data and the identification data are conveyed to the position data administration server 102 after being relayed by the broadcasting device 140 (or the broadcasting devices 142-146) and the gateway 160 (i.e. via the network 180). The wireless terminal 120 may transmit the position data and the identification data to the broadcasting device 140 of several broadcasting devices, which have previously transmitted their respective positioning signals. The relaying process performed by the broadcasting device 140 and the gateway 160 is described later. The position data and the identification data may be transmitted every time the wireless terminal 120 obtains the position data via the positioning signal. The wireless terminal 120 may obtain the position data at a set time, in certain intervals, or in response to a change in accelerated velocity detected by an acceleration sensor incorporated in the wireless terminal 120 (not shown in the figure).

The broadcasting device 140 according to an embodiment of the invention further includes a relaying unit 712.

The relaying unit 712 relays the position data and the identification data, which are transmitted from the wireless terminal 120 to the position data administration server 102, to the other broadcasting device and/or the gateway 160. The relayed data is conveyed to a next node (i.e. the broadcasting device 140 or the gateway 160) based on routing information managed by the broadcasting device 140. The position data and the identification data transmitted by the wireless terminal 120 are conveyed to the gateway 160, and then conveyed to the position data administration server 102. When the network 180 is formed by ZigBee™, the relaying unit 712 may function as a ZigBee Router.

The gateway 160 includes a conversion unit 714 and may manage the network 180. When the network 180 is formed by ZigBee™, the gateway 160 may function as a ZigBee Coordinator.

The communication conversion unit 714 may convert data received from the broadcasting devices 140-146 connected to the network 180 so that the data is suitable for the external network (e.g. the internal network 190 in FIG. 1). The conversion unit 714 may transmit the converted data to the position data administration server 102.

The position data administration server 102 according to an embodiment of this invention includes a position data receiving unit 716 and a position data storage unit 718.

The position data receiving unit 716 may receive the identification data and the position data transmitted by the wireless terminal 120. The position data receiving unit 716 may transfer the received identification data and position data to the position data storage unit 718.

The position data storage unit 718 stores the position data received from the position data receiving unit 716 in tables created for each identification data, which is also received from the position receiving unit 716. FIG. 8A shows an example of a position data administration table which stores the position data of the wireless terminal 120. Similarly, FIG. 8B shows an example of the position data administration table which stores the position data of the information processing device 122. The position data administration table may includes items indicating "Date and Time", "Latitude", "Longitude", and "Floor". "Date and Time" indicates the date and time when the position data is received from the wireless terminal 120 (or the information processing device 122). Alternatively, "Date and Time" may indicate the date and time when the wireless terminal 120 (or the information processing device 122) obtains the position data. In this case, additional data representing the date and time may be transmitted by the wireless terminal 120 (or the information processing device 122). "Latitude", "Longitude", and "Floor" are included in the position data received from the wireless terminal 120 (or the information processing device 122). As stated above, the position data administration tables shown in FIGS. 8A, 8B are created for every identification data set of the wireless terminal 120 (or the information processing device 122) and may store history of position data for a fixed period. FIGS. 9A, 9B also show examples of the position data administration table for the position data received from the wireless terminal 120 and the information processing device 122 at different times. An example stated later refers to the position data administration tables shown in FIGS. 9A, 9B.

Based on the above stated functions, the control apparatus 100 according to an embodiment of this invention may obtain the position data of the wireless terminal 120 carried by the user and the information processing device 122 via the position data administration server 102. Since the wireless terminal 120 and the information processing device 122 may transmit the position data via the network 180 like the PAN, power consumption for the wireless transmission may be decreased as compared to transmitting the position data using an access point.

In the above stated example, the process is to obtain the position data of the wireless terminal 120. However, the position data of the information processing device 122 may also be obtained according to a similar process. In that case, a positioning signal receiving unit 704b and a position data obtaining unit 706b of a positioning unit 720b (corresponding to the position unit 720a) of the information processing device 122 may obtain the position data from the positioning signal broadcast by the broadcasting device 140. A position data transmission unit 710b of the positioning unit 720b transmits to the broadcasting device 140 the position data and the identification data stored in the identification data storage unit 708b.

(3.2 Transmitting Control Signals)

Next, the function by which the control apparatus 100 transmits, when a predetermined condition is met, the control signals to the information processing device 122 is explained.

The control apparatus 100 according to an embodiment of this invention includes a determining unit 730, a position data obtaining unit 732, a state information obtaining unit 734, a control condition storage unit 736, a control condition setting unit 738, a control signal transmission unit 740, and a region data storage unit 742.

The determining unit 730 determines whether the position data of the wireless terminal 120 carried by the user and the information processing device 122 and state information about the information processing device 122 meet a predetermined control condition. When the control condition is met, the determining unit 730 causes the control signal transmission unit 740 (explained later) to transmit predetermined control signals.

Figure 23:
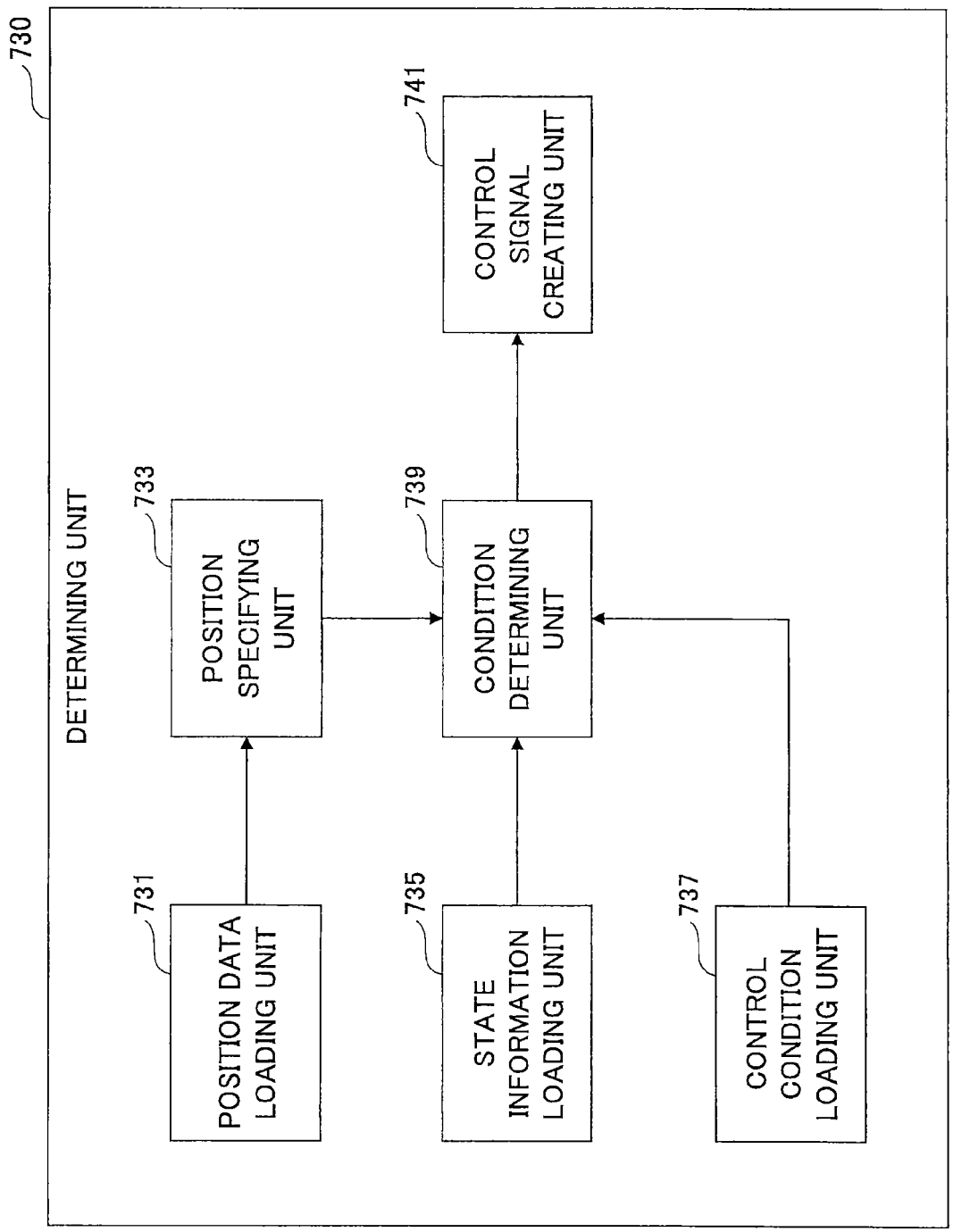
FIG. 23 is a block diagram illustrating exemplary detailed functional configurations of a determining unit of a control apparatus according to an embodiment of this invention.

FIG. 23 shows a detailed functional block diagram of the determining unit 730. The determining unit 730 includes a position data loading unit 731, a position specifying unit 733, a state information loading unit 735, a control condition loading unit 737, a condition determining unit 739, and a control signal creating unit 741.

The position data loading unit 731 loads the position data of the wireless terminal 120 and the information processing device 122 obtained by the position data obtaining unit 732 discussed later.

The position specifying unit 733 may specify locations where the wireless terminal 120 and the information processing device 122 existed in the past and exist at the present time using the position data of the wireless terminal 120 and the information processing device 122 loaded by the position data loading unit 731. The locations where the wireless terminal 120 and the information processing device 122 exist are expressed by broadcasting device identifiers (FIG. 10) assigned to the broadcasting device 140.

In particular, the position specifying unit 731 may obtain any position data of the wireless terminal 120 during the period from "2012/7/17 10:00:00" to "2012/7/17 10:00:20" shown in FIG. 8A. In addition, the position specifying unit 731 may obtain any position data of the information processing device 122 during the period from "2012/7/17 10:00:00" to "2012/7/17 10:00:20" shown in FIG. 8B.

The position specifying unit 732 may specify the broadcasting device identifiers which correspond to the obtained position data using the table shown in FIG. 10. For example, when the position specifying unit 731 obtains the position data of the wireless terminal 120 shown in FIG. 8A, the position specifying unit 731 specifies the broadcasting device identifiers "C5", "C4", "C7", and "C10" as the past and present locations of the wireless terminal 120. In addition, when the position specifying unit 731 obtains the position data of the information processing device 122 shown in FIG. 8B, the position specifying unit 731 specifies the broadcasting device identifier "C5" as the past and present location of the information processing device 122.

Thus, the position specifying unit 731 may specify that the information processing device 122 stands still at the location corresponding to the broadcasting device identifier "C5" and the wireless terminal 120 (the user) moves to the locations "C4", "C7", and "C10" sequentially after standing still at "C5".

In another instance, the position specifying unit 731 may obtain any position data of the wireless terminal 120 during the period from "2012/7/17 10:05:00" to "2012/7/17 10:05:30" shown in FIG. 9A. In addition, the position specifying unit 731 may obtain any position data of the information processing device 122 during the period from "2012/7/17 10:05:00" to "2012/7/17 10:05:30" shown in FIG. 9B.

In this case, the position specifying unit 731 may specify that the information processing device 122 further stands still at the location "C5" and the wireless terminal 120 (the user) moves from the location "C3" to the locations "C6", "C9", "C10", and "C10" sequentially.

The state information loading unit 735 may load the state information about the information processing device obtained by the state information obtaining unit 734 discussed later.

The control condition loading unit 737 may load a condition control table associating control conditions including a condition of the wireless terminal 120 location and a condition of the information processing device 122 state with processing to control the information processing device 122 which is executed when the control conditions are met.

The condition determining unit 733 may determine that the broadcasting device identifiers representing the locations of the wireless terminal 120 and the information processing device 122 specified by the position specifying unit 733 and the state information about the information processing device 122 loaded by the state information loading unit 735 meet the control conditions loaded by the control condition loading unit 737.

FIG. 11 shows an example of the control condition table loaded by the control condition loading unit 737. The control condition table includes items "Number", "Condition of wireless terminal location", "Condition of information processing device state", and "How to control". "Number" indicates a sequence number assigned to each condition.

"Condition of wireless terminal location" means a condition defined by the past or present location of the wireless terminal 120 specified by the position specifying unit 731. As shown in FIG. 11, "Condition of wireless terminal location" may be defined by a single broadcasting device identifier. Alternatively, "Condition of wireless terminal location" may be defined by several broadcasting device identifiers. For example, when the condition defined in the table indicates "C1, C4, C7", the wireless terminals 120 which are in the locations corresponding to the broadcasting device identifiers "C1", "C4", and "C7" meet the condition. Furthermore, "Condition of wireless terminal location" may be defined by a positional relationship with a certain information processing device 122 such as "Identical to information processing device (002673abcd02)". "002673abcd02" indicates the unique identification data to identify the information processing device 122.

"Condition of information processing device state" means a condition based on the state information about the information processing device 122. Examples of "Condition of information processing device state" are as follows.

"Locked" is a state in which the login user locks the system so as not to be operated by other users.

"Unlocked" is a state in which the login user does not lock the system

"Standby for execution of user's printing job" is a state for waiting for execution of a printing job issued by the user "System standby" is a state in which the system disables some of the functions to cut the power consumption "How to control" means the processing to control the information processing device 122 when "Condition of wireless terminal location" and "Condition of information processing device state" are met. For example, "Unlock" to unlock the lock state for the information processing device, "Lock" to lock the information processing device, "Execution for the printing job" to execute the waiting printing job, and "Resume from system standby" to resume from the standby state, as shown in FIG. 11, may be defined. The above stated conditions and processing may be set by the user in advance.

The condition determining unit 733 determines the conditions are met when the locations (expressed by the broadcasting device identifier) of the wireless terminal 120 and the information processing device 122 specified by the position specifying unit 731 meet "Condition of wireless terminal location"; and the state information loaded by the state information loading unit 735 meets "Condition of information processing device state".

When the position data of the wireless terminal 120 and the information processing device 122 is expressed in FIGS. 8A, 8B, the position specifying unit 733 specifies "C10" as the location of the wireless terminal 120. In addition, provided that the condition determining unit 739 receives the state information about the information processing device 122

"Unlocked" from the state information loading unit 735, the condition determining unit 739 determines that the conditions of "Number" "2" among the conditions shown in FIG. 11 are met.

Alternatively, when the position data of the wireless terminal and the information processing device is expressed in FIGS. 9A, 9B, the position specifying unit 733 specifies "C7" as the location of the wireless terminal 120. In addition, provided that the condition determining unit 739 receives the state information about the information processing device 122 "Standby for execution of user's printing job" from the state information loading unit 735, the condition determining unit 739 determines that the conditions of "Number" "3" among the conditions shown in FIG. 11 are met.

The condition determining unit 739 notifies the control signal creating unit 741 of the processing (i.e. "How to control") when the control conditions are met.

The control signal creating unit 741 may create a control signal allowing the information processing device 122 to execute the processing determined by the condition determining unit 739 and instruct the control signal transmission unit 740 to transmit the control signal. The control signal creating unit 741 transfers to the control signal transmission unit 740 the identification data of the information processing device to which the control signal is transmitted and information about the processing (e.g. a command which may be understood by the information processing device 122).

For example, when the position data of the wireless terminal and the information processing device is expressed in FIGS. 8A, 8B and when the state information about the information processing device 122 is "Unlocked", the condition "Number" "2" is met as shown in FIG. 11. Thus, the control signal creating unit 741 creates the control signal including the command to "Lock" and transfers to the control signal transmission unit 740 the control signal and the identification data of the information processing device 122 to which the control signal should be transmitted.

Alternatively, when the position data of the wireless terminal 120 and the information processing device 122 is expressed in FIGS. 9A, 9B and when the state information about the information processing device 122 is "Standby for execution of user's printing job", the condition "Number" "3" is met as shown in FIG. 11. Thus, the control signal creating unit 741 creates the control signal including the command for "Execution for the printing job (issued by the user of the wireless terminal 120)" and transfers to the control signal transmission unit 740 the control signal and the identification data of the information processing device 122 to which the control signal should be transmitted.

In response to the instruction from the determining unit 730, the position data obtaining unit 732 obtains the position data of the wireless terminal 120 and the information processing device 122 corresponding to the identification data from the position data storage unit 718 of the position data administration server 102. The position data obtaining unit 732 transfers the obtained position data to the determining unit 730. The position data obtaining unit 732 may transfer not only the present (latest) position data of the wireless terminal 120 and the information processing device 122 but the history of the position data for a certain period.

The state information obtaining unit 734 obtains the state information about the information processing device 122 in response to the instruction from the determining unit 730. Since the state information obtaining unit 734 may hold connection information which is required to connect each information processing device 122 and identified by the identification data, the state information obtaining unit 734 may connect with the information processing device 122 using the connection information and obtain the state information. The state information may be stored in the state information storage unit 750 of the information processing device 122 described later. The state information may indicate "Locked", "Unlocked", "Standby for execution of user's printing job", or "System standby", for example. However, the state information is not limited to the above example. The state information may indicate any hardware or software state of the information processing device 122. The state information may be expressed in any manner. For example, each state may be expressed by an ID number. In this case, a table associating the ID number with the state may be shared in the control apparatus 100 and the information processing device 122. The state information obtaining unit 734 may transfer the obtained state information to the determining unit 730.

As stated above, the control condition storage unit 736 stores the control condition table shown in FIG. 11, and the control condition storage table may transfer the content of the control condition table to the determining unit 730 in response to a query from the determining unit 730. The control conditions are pre-configured by the user via the control condition setting unit 738 in advance.

The control condition setting unit 738 may configure the above stated control conditions based on user's input. The control condition setting unit 738 may accept a XML file in a certain format as shown in FIGS. 12A, 12B and configure the control conditions as shown in FIG. 11. Elements and attributes in the XML file shown in FIGS. 12A, 12B correspond to the items in the control condition table shown in FIG. 11. For example, "Number" in the control condition table shown in FIG. 11 corresponds to the "id" attribute in the "entry" element in the XML file shown in FIGS. 12A, 12B. In addition, "Condition of wireless terminal location" corresponds to the "device_id" attribute in the "condition_location" element, "Condition of information processing device state" corresponds to the "name" attribute in the "condition_state" element, and "How to control" corresponds to the "name" attribute in the "action" elements. "Condition of wireless terminal location" may be specified by the known identifier of the broadcasting device 140 such as "C10", or the identification data of the information processing device such as "002673abcd02". At the former, the absolute position in which the broadcasting device 140 is installed may be used as "Condition of wireless terminal location" (e.g. the conditions "Number" "1" or "2" in the control condition table shown in FIG. 11). At the latter, the relative position in which the information processing device 122 is installed may be used as the condition (e.g. the condition "Number" "4" in the control condition table).

The control condition setting unit 738 may create the control condition table as shown in FIG. 11 based on such elements and attributes and store the control condition table in the control condition storage unit 736.

In order to set multiple "Conditions of wireless terminal location" such as the condition "Number" "3" in the control condition table shown in FIG. 11, some values may be described together in the "condition_location" element 1200 as shown in FIG. 12B.

In addition, in order to set multiple "Conditions of wireless terminal location", a range of the position may be described as shown in FIG. 13. In FIG. 13, the "area" attribute for enabling the range description in the "condition_location" element, the "device_id" attribute for specifying the identifier of the broadcasting device which indicates the center of the area, the "latitude" attribute for expressing the range by degrees of latitude from the position specified in the "device_id" attribute, and the "longitude" attribute for expressing the range by degrees of longitude from the position specified in the "device_id" attribute are described. When the control condition setting unit 738 loads the "Conditions of wireless terminal location" expressed using the range, the control condition setting unit 738 refers to the table storing the position data of the installed broadcasting device shown in FIG. 10 and specifies all of the broadcasting devices existing within the range. In the example shown in FIG. 13, the broadcasting devices "C1"-"C9" are specified which exist within the range plus or minus 0.00005 degrees in latitude and plus or minus 0.00005 degrees in longitude from the position in which the broadcasting device "C5" is. The control condition setting unit 738 sets the specified identifiers of the broadcasting devices as "Condition of wireless terminal location" in the control condition table. In the example as described using FIG. 13, the control condition setting unit 738 creates a condition indicating "C1" "C9" in "Condition of wireless terminal location". In the above example, "degree" is used. However, any units such as "m" may be used to specify the range.

When the range is used for setting of "Condition of wireless terminal location", the control condition setting unit 738 may automatically modify the setting by referring to floor data (region data), such as a floor map of the environment where the broadcasting devices are installed, so that the range is not set across an impracticable border (e.g. a wall or a security gate). For example, provided that the region data of the environment shown in FIG. 2 may be available, when such borders (e.g. walls) exist between the position of the broadcasting device specified as the center of the range and the positions of the other broadcasting devices within the range (e.g. on any routes expressed by lines or curves between the broadcasting devices), the control condition setting unit 738 does not set the other broadcasting devices in "Condition of wireless terminal location". In the above stated example shown in FIG. 13, the control condition setting unit 738 specifies the broadcasting devices "C1"-"C9". However, due to the above modification, the control condition setting unit 738 may exclude the broadcasting devices "C2", "C3", "C6", and "C9" since there is a wall between the broadcasting device "C5" and each broadcasting device (i.e. "C2", "C3", "C6", or "C9"). The condition of "Number" "3" in the control condition table shown in FIG. 11 shows the result of the modification by the control condition setting unit 738. The region data including the floor map or information about the impracticable border may be stored in the region data storage unit 742 stated later.

In addition, when the range is used to set "Condition of wireless terminal location", the control condition setting unit 738 may refer to the region data and dynamically modify the values of the "latitude" attribute and the "longitude" attribute of the "condition_location" element which are described on the configuration file. For example, when no broadcasting device is found in the range specified by the configuration file, the control condition setting unit 738 may modify the values of the "latitude" attribute and the "longitude" attribute so that at least one or more broadcasting devices are included in the range. Alternatively, the control condition setting unit 738 may automatically adjust the values of the "latitude" and the "longitude" attributes which are relatively broad for the environment (e.g. the specified range includes the entire field of the environment) to or less than the predetermined value (e.g. a predetermined value for each environment).

The elements and attributes which may be described in the configuration file may be used in any combination. For example, the identification data of the information processing device may be specified in the "device_id" attribute of the "condition_location" elements, and the range may be used to specify the positions as shown in FIG. 13. As a result, the broadcasting devices within a certain area may be specified using "Condition of wireless terminal location" of the control condition table based on the position of the information processing device which is movable.

Such configuration for the control condition using the configuration file is just an example. The configuration may be done using an interactive method with graphical user interface (GUI) such as an application or a Web browser.

The control signal transmission unit 740 may receive the identification data and the control signal from the determining unit 730 and transmit the control signal to the information processing device 122 specified by the identification data. The connection information used by the control signal transmission unit 740 to connect with the information processing device 122 may be associated with the identification data and stored in the control apparatus 100. The control signal may be conveyed to the information processing device 122 via the network 180 or the network 190 formed by the wireless or wired LAN.

The region data storage unit 742 may store the floor data (region data) such as a floor map of the environment in which the broadcasting device 140, the information processing device 122 and the wireless terminal 120 may exist. The region data associates objects on the floor map as shown in FIG. 2 with latitude and longitude. The region data includes data indicating the positions of the broadcasting devices 140 or the impracticable borders (e.g. a wall or a security gate) on the floor map. The data is referred by the control condition setting unit 738 and may be used for range-based configuration about "Condition of wireless terminal location".

The information processing device 122 according to an embodiment of the invention includes a positioning unit 720b, a state information storage unit 750, a control signal receiving unit 756, and a control unit 758. As stated above, the positioning unit 720b has functions in common with the positioning unit 720a of the wireless terminal 120.

The state information storage unit 750 includes a printing job state storage unit 752 and a lock state storage unit 754. The printing job state storage unit 752 may store information indicating a state of the printing job issued by the user operation for the information processing device 122 (i.e. image forming device). The state of the printing job may be stored for each user. The lock state storage unit 754 may store a lock state of the information processing device 122. The state of the printing job or the lock state may be configured so that the state information obtaining unit 734 of the control apparatus 100 may access the states.

The control signal receiving unit 756 may receive the control signal transmitted by the control signal transmission unit 740 of the control apparatus 100 and transfer the control signal to the control unit 758.

The control unit 758 may receive the control signal from the control signal receiving unit 756 and control the information processing device 122 according to the processing indicated by the control signal. Examples of the processing include, as stated above, "Unlock" to unlock the information processing device, "Lock" to lock the information processing device, "Execution for the printing job" to execute the waiting printing job, and "Resume from system standby" to resume from the standby state.

With the above stated functions, the control apparatus 100 according to this embodiment may control the information processing device 122 when the user carrying the wireless terminal 120 reaches a predetermined position. For example, when a printing job is issued by the user and the user reaches the predetermined area centering on an information processing device, the control apparatus 100 allows the information processing device 122 to start to execute the printing job. As a result, that prevents the user from leaving the printed paper on the information processing device 122. Additionally, when the user reaches the predetermined area centering on an information processing device, the control apparatus 100 allows the information processing device 122 to lock or unlock the system of the information processing device 122. As a result, convenience for the user is advantageously improved.

(4. Process Flow)

Figure 14:
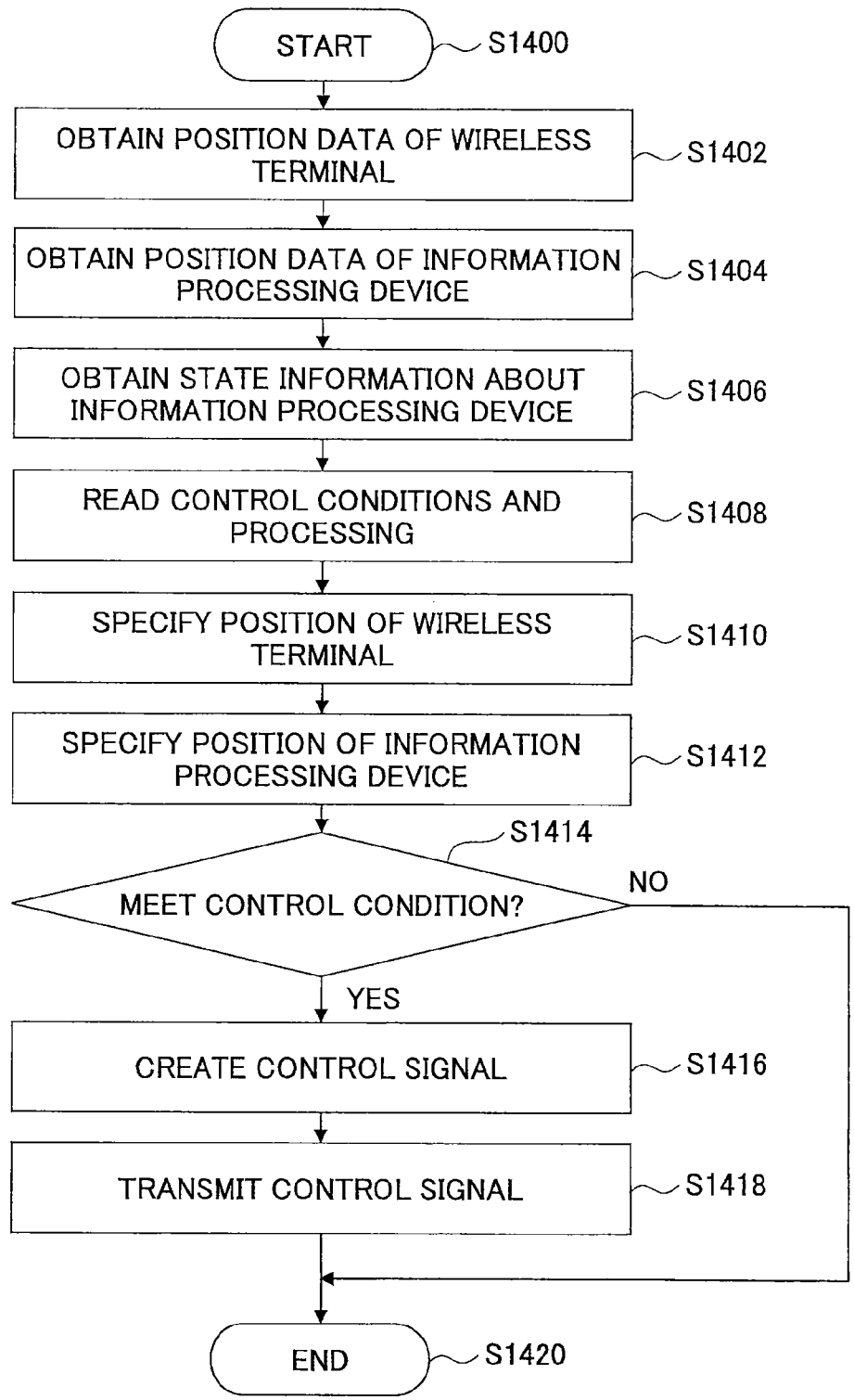
FIG. 14 is a flowchart illustrating a process performed by a control apparatus according to an embodiment of this invention.

With reference to FIG. 14, the process of the control apparatus 100 according to an embodiment of this invention is explained. The process shown in FIG. 14 is repeatedly executed when any of the following conditions are met.

A certain period of time passes

In response to an instruction received from other devices or the user

In response to an update for the position data administration table stored in the position data administration server 102

In any time

In Step S1400, the process of the control apparatus 100 starts.

In Step S1402, the position data obtaining unit 732 obtains the position data of the wireless terminal 120 (the present position data and/or the history of the position data for a fixed period) from the position data storage unit 718 of the position data administration server 102. For example, the position data from "2012/7/17 10:05:00" to "2012/7/17 10:05:30" included in the position data administration table shown in FIG. 9A is obtained. That indicates (the user of) the wireless terminal 120 starts to move from the broadcasting device "C3", via "C6", "C9", "C10", and reaches "C7".

In Step S1404, the position data obtaining unit 732 obtains the position data of the information processing terminal 122 (the present position data and/or the history of the position data for a fixed period) from the position data storage unit 718 of the position data administration server 102. For example, the position data from "2012/7/17 10:05:00" to "2012/7/17 10:05:30" included in the position data administration table shown in FIG. 9B is obtained. That indicates the information processing device 122 is fixed on the position "C5".

In Step S1406, the state information obtaining unit 734 obtains the state information about the information processing device 122 from the state information storage unit 750 of the information processing device 122. Here, the state information of the information processing device 122 representing "Standby for execution of user's printing job" is obtained.

In Step S1408, the control condition loading unit 737 of the determining unit 730 loads the control conditions and the processing (how to control) from the control condition storage unit 736. The control condition table shown in FIG. 11 stores the control conditions and the processing (how to control).

In Step S1410, the position specifying unit 733 of the determining unit 730 specifies the broadcasting device identifier(s) corresponding to the position data obtained in Step S1402 using the table shown in FIG. 10.

In Step S1412, the position specifying unit 733 of the determining unit 730 specifies the broadcasting device identifier(s) corresponding to the position data obtained in Step S1404 using the table shown in FIG. 10.

In Step S1414, the condition determining unit 739 of the determining unit 730 determines that the control conditions are met (i.e. "Condition of wireless terminal location" and "Condition of information processing device state" in the control condition table shown in FIG. 11 are met).

When the conditions are met, the process goes to Step S1416. Otherwise, the process goes to Step S1420 and ends.

Here, since the specified broadcasting device identifier is "C7" from the position data of the wireless terminal 120, and the state information about the information processing device 122 represents "Standby for execution of user's printing job", the condition determining unit 739 determines that the condition "Number" "3" is met.

In Step S1416, the control signal creating unit 741 of the determining unit 730 creates the control signal (command) allowing the information processing device 122 to "execute for the printing job" defined in the control condition table.

In Step S1418, the control signal transmission unit 740 transmits to the information processing device 122 the control signal using the connection information about the information processing device 122 associated with the identification data of the information processing device 122. The information processing device 122 receiving the control signal controls itself according to the control signal. Here, when the information processing device 122 receives the control signal for "execution for the printing job" created in Step S1416, the information processing device 122 starts to execute the printing job issued by the user of the wireless terminal 120.

In Step S1420, the process ends.

Figure 15:
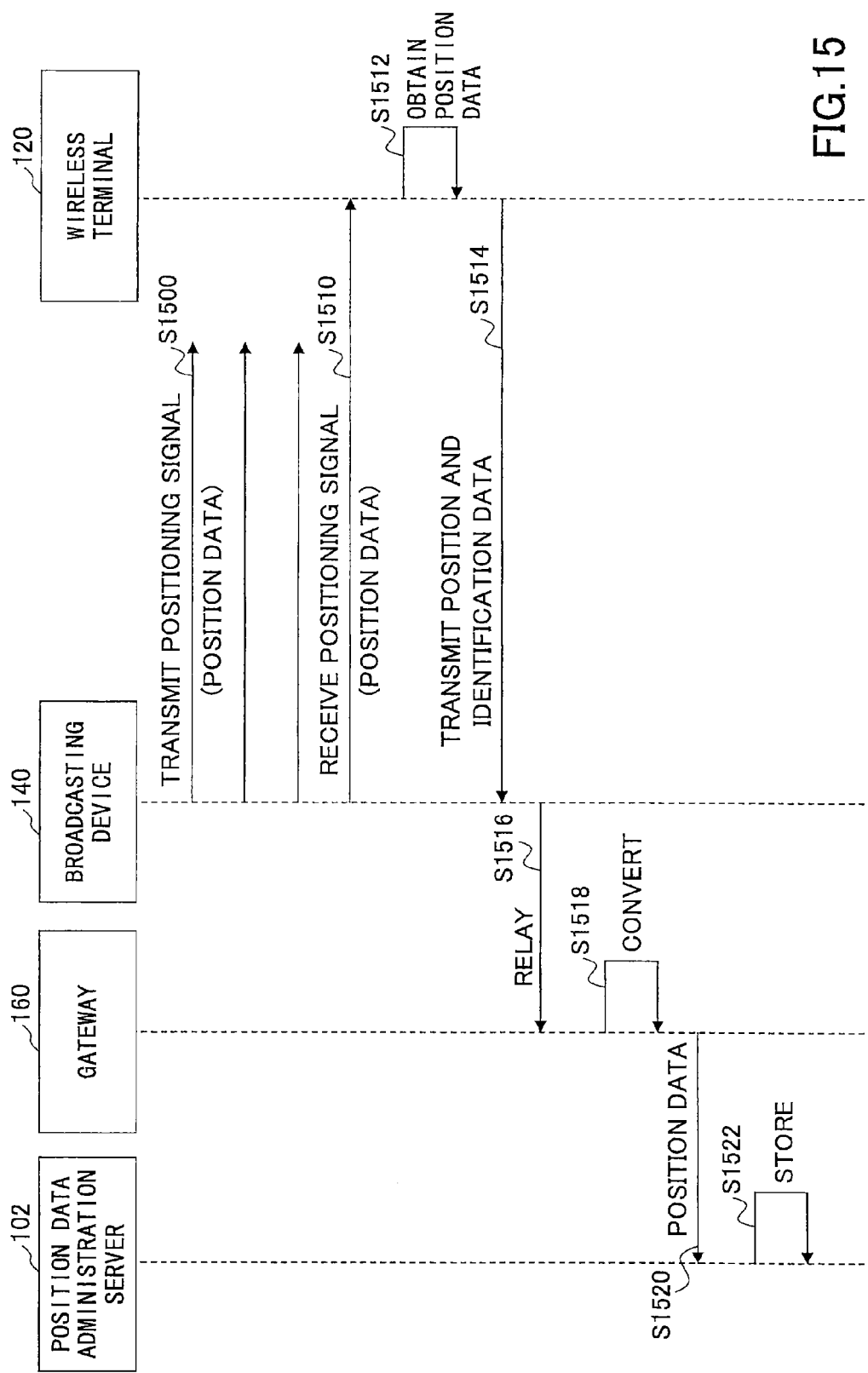
FIG. 15 is a sequence chart illustrating a process performed by a system according to an embodiment of this invention.
Figure 16:
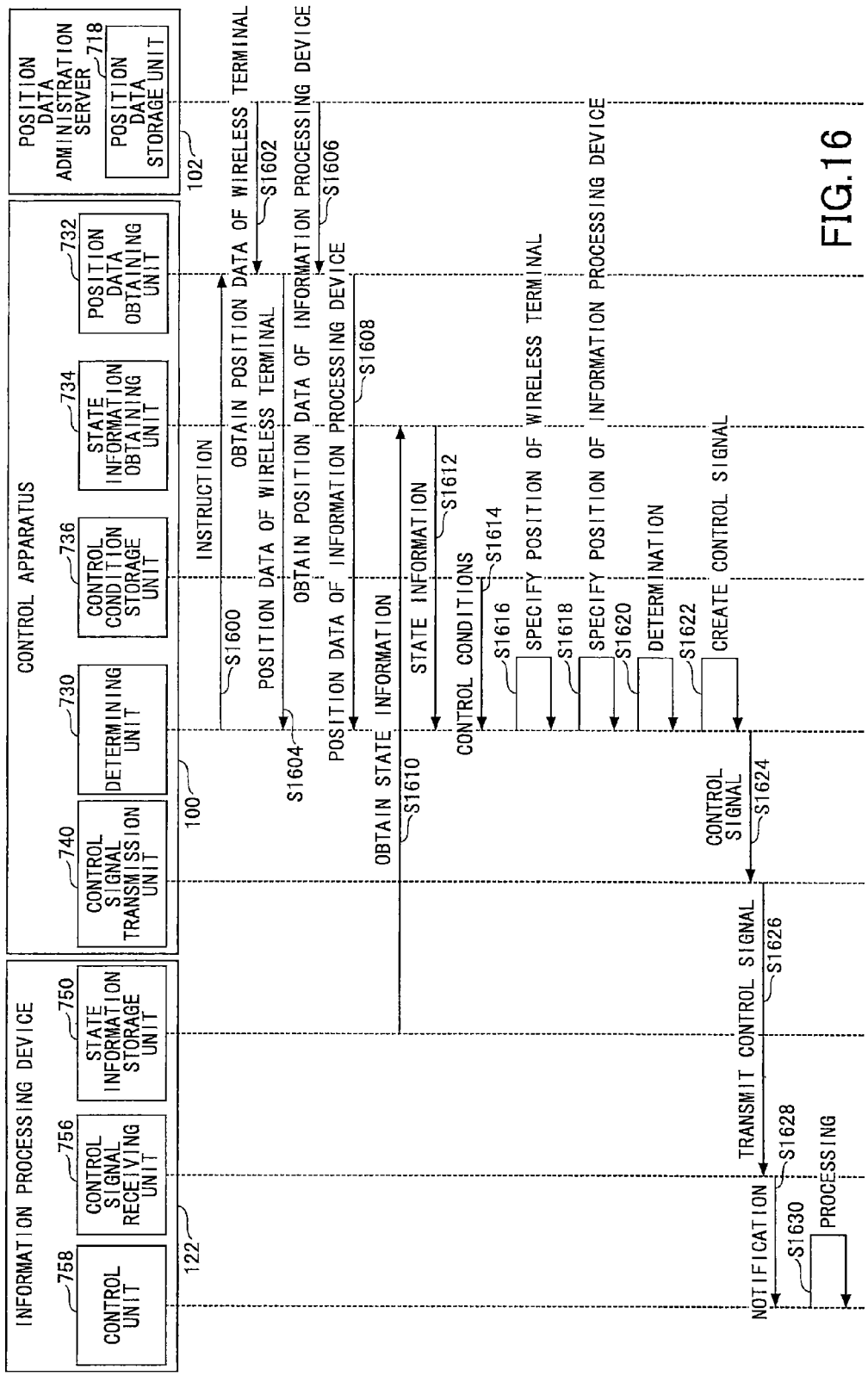
FIG. 16 is a sequence chart illustrating a process performed by a system according to an embodiment of this invention.

With reference to FIGS. 15, 16, the process of the system including the control apparatus 100 according to an embodiment of this invention is explained. Here, the user carrying the wireless terminal 120 approaches the information processing device 122 to collect the printed paper after instructing the information processing device 122 to print out a document, which is installed in the environment shown in FIG. 2. The position data of the wireless terminal 120 and the information processing device 122 is shown in FIGS. 9A, 9B respectively. Thus, the information processing device 122 is fixed to "C5" position. The wireless terminal 120 moves with the user from "C3" to "C7" via "C6", "C9", and "C10" positions.

FIG. 15 shows the process performed by the wireless terminal 120 to transmit the position data to the position data administration server 102. The information processing device 122 also transmits the position data to the position data administration server 102 according the same process with the wireless terminal 120. The steps shown in FIG. 15 (especially Steps S1510-S1522) are executed when any of the following conditions are met.

A certain period of time passes

In response to an instruction to perform the steps from other devices or the user In response to a detection of a change in accelerated velocity detected by the acceleration sensor (i.e. a move of the wireless terminal 120)

In any time

In Step S1500, the positionig signal transmitting unit 702 of the broadcasting device 140, which has the broadcast device identifier "C7", transmits the positioning signal including the following position data to a predetermined area.

Latitude "35.66640"

Longitude "139.76520"

Floor "4"

The position data transmitted by the broadcasting device 140 having the broadcasting device identifier "C7" is administrated by the table shown in FIG. 10 and stored in the control apparatus 100.

In Step S1510, the positioning signal receiving unit 704a of the wireless terminal 120 receives the position signal transmitted by the positioning signal transmitting unit 702 of the broadcasting device 140 having the broadcasting device identifier "C7".

In Step S1512, the position data obtaining unit 706a of the wireless terminal 120 obtains the position data from the received positioning signal. The position data is included in a predetermined field of a frame forming the positional signal according to the IMES standard. Here, the position data obtained by the wireless terminal 120 is as follows.

Latitude "35.66640"
Longitude "139.76520"
Floor "4"

In Step S1514, the position data transmission unit 710a of the wireless terminal 120 transmits to the broadcasting device 140 the above position data as well as the identification data stored in the identification data storage unit 708. Here, the identification data (i.e. MAC address) of the wireless terminal 120 is as follows.

Identification data "002673abcd01"

In Step S1516, the relaying unit 712 of the broadcasting device 140 relays the position data and the identification data received from the wireless terminal 120 to the gateway 160.

In Step S1518, the gateway 160 converts the data received from the network 180 to which the broadcasting device 140 is connected into the data which is suitable for the network 190 such as a LAN.

In Step S1520, the position data receiving unit 716 of the position data administration server 102 receives the position data and the identification data of the wireless terminal 120 via the broadcasting device 140 and the gateway 160.

In Step S1522, the position data storage unit 718 of the position data administration server 102 stores the position data of the wireless terminal 120 using the received identification data. Here, the date and time in which the position data administration server 102 receives the position data from the wireless terminal 120 is also stored. In this example, the position data administration server 102 administrates the position data received from the wireless terminal 120 using the position data administration table as shown in FIG. 9A. In this example, the following data is stored.

Date and time "2012/7/17 10:05:30"
Latitude "35.66640"
Longitude "139.76520"
Floor "4"

With the above process, the position data administration server 102 according to this embodiment of this invention may administrate the position data of the wireless terminal 120 carried by the user and the information processing device 122.

FIG. 16 shows the process performed by the control apparatus 100 to control the information processing device 122 according to the obtained data from the position data administration server 102 and the information processing device 122. This process may start just after the execution of the above stated process shown in FIG. 15. A series of the steps shown in FIG. 16 are executed when any of the following conditions are met.

A certain period of time passes

In response to an instruction to perform the process from other devices or the user In response to an update for the position data administration table stored in the position data administration server 102

In any time

In Step S1600, the determining unit 730 (the position specifying unit 733) of the control apparatus 100 instructs the position data obtaining unit 732 to obtain the position data of the wireless terminal 120 and the information processing device 122.

In Step S1602, the position data obtaining unit 732 of the control apparatus 100 obtains the position data of the wireless terminal 120 (the present position data and/or the history of the position data for a fixed period) from the position data storage unit 718 of the position data administration server 102. Here, the position data obtaining unit 732 obtains the position data from "2012/7/17 10:05:00" to "2012/7/17 10:05:30" stored in the position data administration table shown in FIG. 9A.

In Step S1604, the determining unit 730 (the position data obtaining unit 732) of the control apparatus 100 reads the position data of the wireless terminal 120 obtained in Step S1602.

In Step S1606, the position data obtaining unit 732 of the control apparatus 100 obtains the position data of the information processing device 122 (the present position data and/or the history of the position data for a fixed period) from the position data storage unit 718 of the position data administration server 102. For example, the position data from "2012/7/17 10:05:00" to "2012/7/17 10:05:30" included in the position data administration table shown in FIG. 9B is obtained.

In Step S1608, the determining unit 730 (the position data loading unit 731) of the control apparatus 100 reads the position data of the information processing device 122 obtained in Step S1606.

In Step S1610, the state information obtaining unit 734 of the control apparatus 100 obtains the state information about the information processing device 122 from the state information storage unit 750 of the information processing device 122. Here, the state information about the information processing device 122 representing "Standby for execution of user's printing job" is obtained.

In Step S1612, the determining unit 730 (state information loading unit 735) of the control apparatus 100 obtains the state information about the information processing device 122 obtained in Step S1610.

In Step S1614, the determining unit 730 (the control condition loading unit 737) of the control apparatus 100 reads the control condition table stored in the control condition storage unit 736 shown in FIG. 11.

In Step S1616, the determining unit 730 (the position specifying unit 733) of the control apparatus 100 specifies the (present and past) positions of the wireless terminal using the broadcasting device identifiers. Here, the determining unit 730 specifies "C3", "C6", "C9", "C10" as the past positions and "C7" as the present position.

In Step S1618, the determining unit 730 (the position specifying unit 733) of the control apparatus 100 specifies the positions of the information processing device using the broadcasting device identifiers. Here, the determining unit 730 specifies "C5" as the past and the present position of the information processing device 122.

In Step S1620, the determining unit 730 (the condition determining unit 739) of the control apparatus 100 determines that the control conditions "Condition of wireless terminal location" and "Condition of information processing device state" in the control condition table shown in FIG. 11 are met. Here, the wireless terminal 120 is located in "C7" position at present, and the information processing device 122 is located in "C5" position. In addition, the state information about the information processing device 122 represents "Standby for execution of user's printing job". Thus, the determining unit 730 (the condition determining unit 739) determines that the control condition "Number" "3" is met (i.e. the wireless terminal locates in "C1", "C4", "C5", "C7", or "C8" position, and the state information about the information processing device represents "Standby for execution of user's printing job" in the control conditions shown in FIG. 11.

In Step S1622, the determining unit 730 (the control signal creating unit 741) of the control apparatus 100 creates the control signal for "execution for the printing job" defined in the control condition table.

In Step S1624, the determining unit 730 (the control signal creating unit 741) of the control apparatus 100 transfers the created control signal to the control signal transmission unit 740.

In Step S1626, the control signal transmission unit 740 of the control apparatus 100 transmits to the information processing device 122 the control signal using the connection information about the information processing device 122 associated with the identification data of the information processing device 122.

In Step S1628, the control signal receiving unit 756 notifies the control unit 758 of the received control signal.

In Step S1630, the control unit 758 executes the processing according to the control signal. Here, the information processing device 122 starts to execute the printing job issued by the user carrying the wireless terminal 120.

With the above process, the control apparatus according to this embodiment allows the information processing device 122 to execute predetermined processing when the user carrying the wireless terminal 120 reaches a predetermined position. Since the printing job is executed only when the user reaches the position(s) which may be relatively specified by the position of the information processing device, the user is prevented from forgetting to collect the printed paper from the information processing device 122.

(5. Variant)

Next, a variant of this invention is explained. In the above stated example, the information processing device 122, which may execute various processing, may receive the positioning signal broadcast by the broadcasting device 140 and obtain the position data. On the other hand, an information processing device 122A in this variant does not have the positioning signal receiving unit for receiving the positioning signal transmitted by the broadcasting device. Alternatively, a communication terminal 122B in the form of a small tag is attached to the information processing device 122A, and the communication terminal 122B may receive the positioning signal. The communication terminal 122B may obtain the position data from the broadcasting device 140 and transmit the position data to the position data administration server 102 in common with the wireless terminal 120.

The position data administration server 102 stores information about a correspondence relationship between the communication terminal 122B and the information processing device 122A using the identification data. Thus, when the control apparatus 100 obtains the position data of the information processing device 122A, the control apparatus 100 obtains the position data of the communication terminal 122B associated with the information processing device 122A.

With such configuration, the present invention may apply to the information processing device which does not have a positioning function.

(Hardware Configurations)

Figure 17:
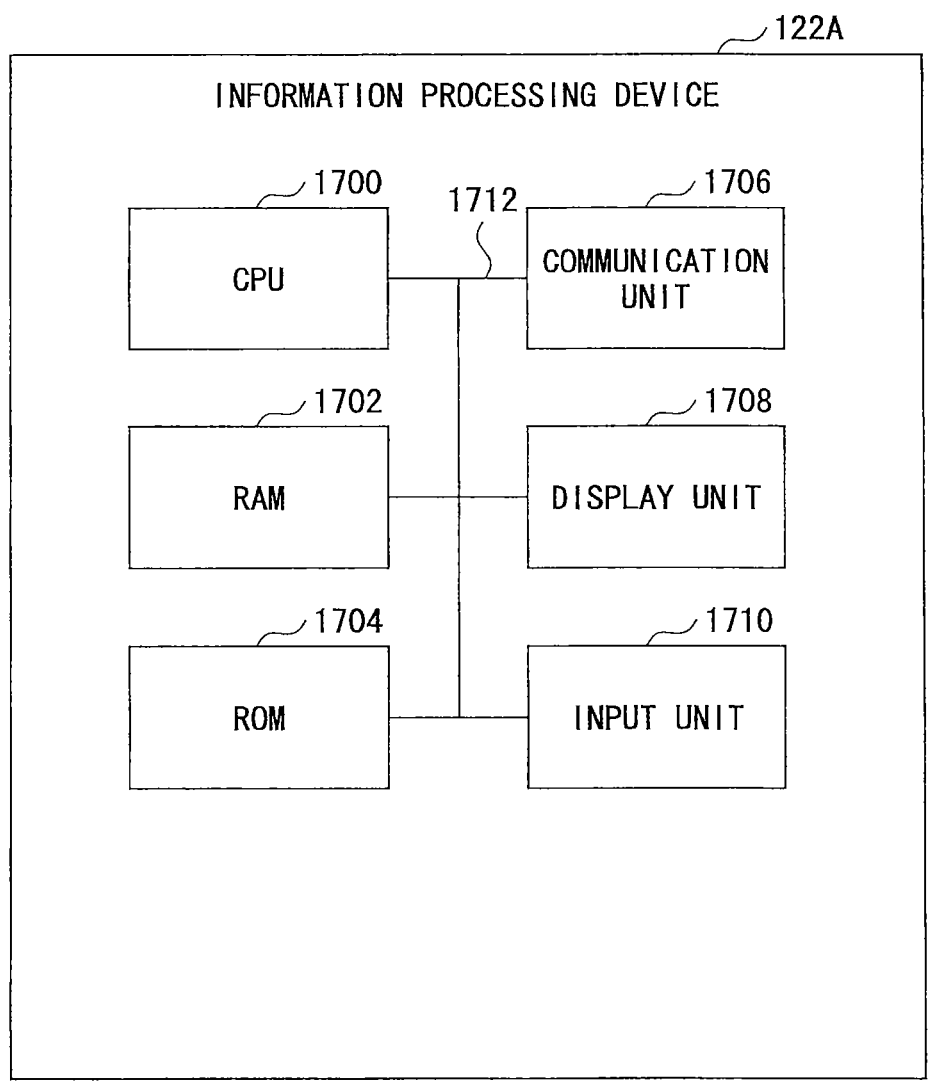
FIG. 17 is a block diagram illustrating an exemplary hardware configuration of an information processing device according to an embodiment of this invention.
Figure 18:
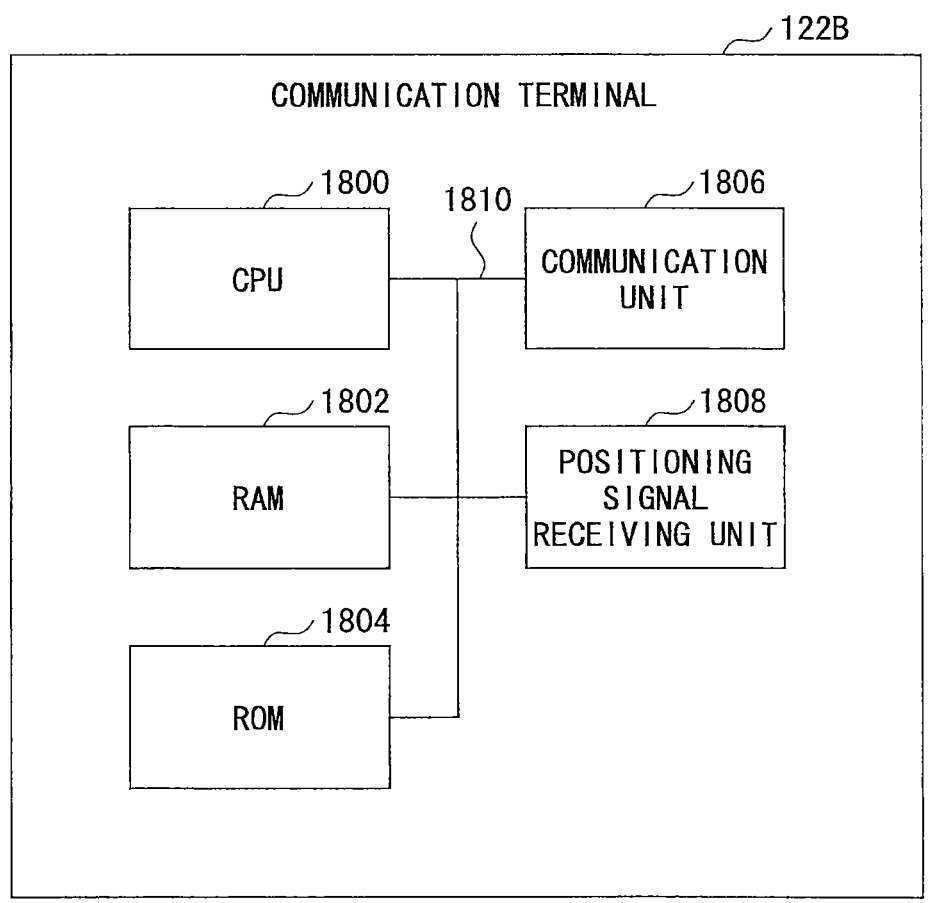
FIG. 18 is a block diagram illustrating an exemplary hardware configuration of a wireless terminal according to an embodiment of this invention.

FIGS. 17, 18 show hardware configurations of the information processing device 122A and the communication terminal 122B according to this variant. The hardware configurations of the control apparatus 100, the wireless terminal 120, the broadcasting device 140, and the gateway 160 have already been shown in FIGS. 3-6.

FIG. 17 shows an exemplary hardware configuration of the information processing device 122A. The information processing device 122A includes a CPU 1700, a RAM 1702, a ROM 1704, a communication device 1706, a display device 1708, an input device 1710, and a bus 1712.

The CPU 1700 executes programs controlling the information processing device 122A. The RAM 1702 may operate as a working memory for the CPU 1700. The ROM 1704 stores programs executed by the CPU 1700 as well as data required to execute the programs. The communication device 1706 may communicate with an external device via a wireless or wired LAN. The display device 1708, such as a liquid crystal display, may provide visual information to the user. The input device 1710, such as mechanical buttons or a touch panel, may accept input from the user. The bus 1712 interconnects the above devices electrically.

With the above configuration, the information processing device 122A according to this example may execute processing according to an instruction received from the control apparatus 100.

FIG. 18 shows an exemplary hardware configuration of the communication terminal 122B according to an embodiment of this invention. The communication terminal 122B includes a CPU 1800, a RAM 1802, a ROM 1804, a communication device 1806, a positioning signal receiving device 1808, and a bus 1810.

The CPU 1800 executes programs controlling the communication terminal 122B. The RAM 1802 may operate as a working memory for the CPU 1800. The ROM 1804 stores programs executed by the CPU 1800 as well as data required to execute the programs. The communication device 1806 may communicate with an external device according to a short range wireless communication method such as Zig-Bee™ or Bluetooth™. The positioning signal receiving device 1808 may receive a positional signal whose frame format is formed according to IMES, which is transmitted by the broadcasting device 140. The bus 1810 interconnects the above devices electrically.

With the above configuration, the communication terminal 122B according to this embodiment may receive the positioning signal and obtain the position data in place of the information processing device 122A. In addition, the communication terminal 122B may transmit the obtained position data to the position data administration server 102 via the PAN. As a result, the position data administration server 102 may track the position of the information processing device 122A which does not have the positioning signal receiving unit.

(Functional Block)

Figure 19:
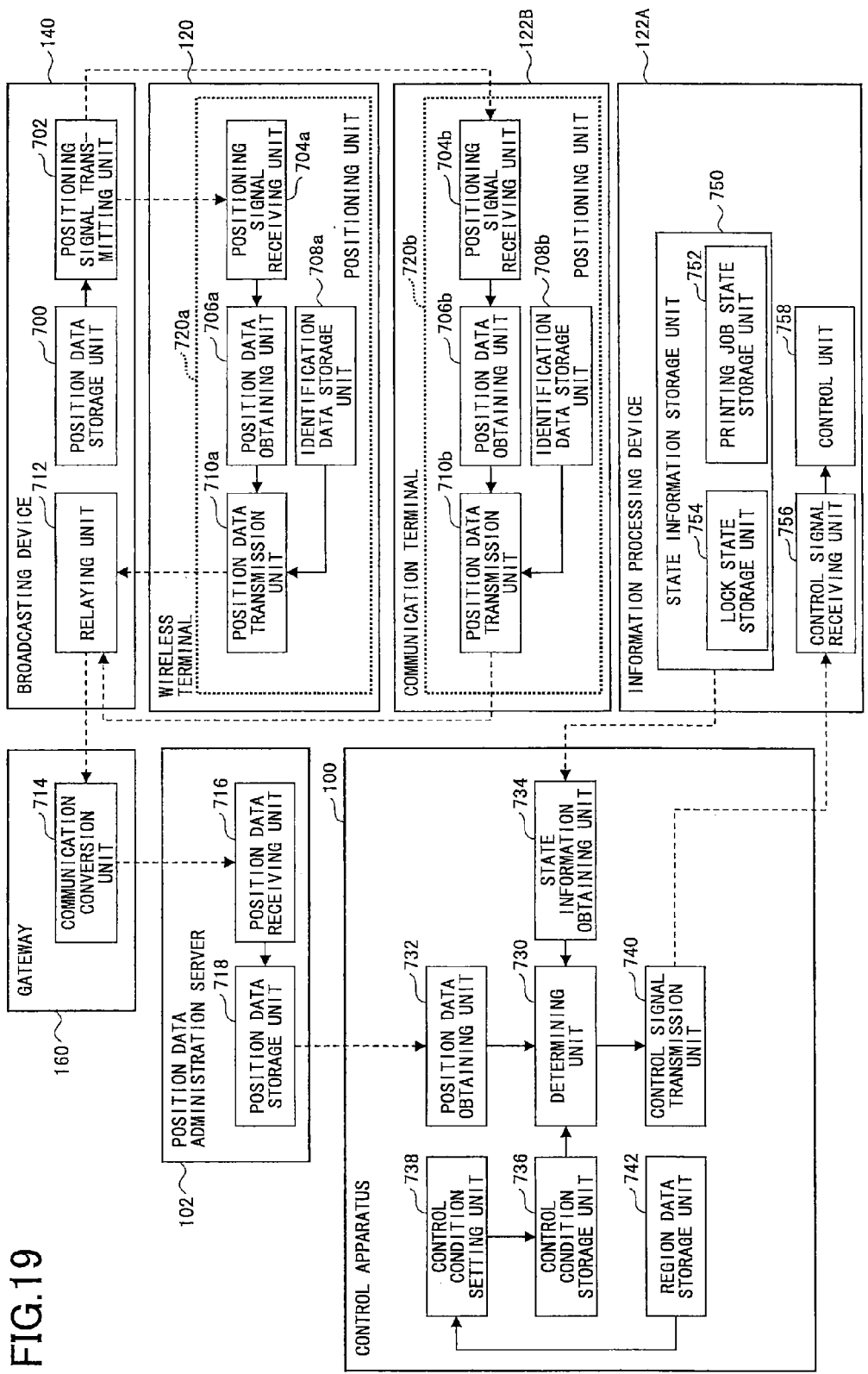
FIG. 19 is a block diagram illustrating exemplary functional configurations of a control apparatus, a wireless terminal, an information processing device, a broadcasting device, a gateway, and a position data administration server according to an embodiment of this invention.

With reference to FIG. 19, the functional block diagram is explained for the control apparatus 100, the wireless terminal 120, the information processing device 122A, the communication terminal 122B, the broadcasting device 140, the gateway 160 and the position data administration server 102. Unlike the functional block diagram shown in FIG. 7, the information processing device 122A does not have the positioning unit 720b. On the other hand, the communication terminal 122B has the positioning unit 720b.

The communication terminal 122B has the positioning unit 720b including a positioning signal receiving unit 704b, a position data obtaining unit 706b, an identification data storage unit 708b, a position data transmission unit 710b. The positioning unit 720b may receive the positioning signal broadcast by the broadcasting device 140, obtain the position data from the positioning signal, and transmit the position data and the identification data to the position data administration server 102 via the broadcasting device 140 as with the positioning unit 720a of the wireless terminal 120 shown in FIG. 7.

FIG. 20 shows an example of the position data of the communication terminal 122B received an administrated by the position data administration server 102. The position data administration server 102 has information about the correspondence relationship between the communication terminal 122B and the information processing device 122A in advance. Thus, the position data administration server 102 may track the position of the information processing device 122A using the identification data and the position data transmitted from the position unit 720b of the communication terminal 122B.

(Process Flow)

Figure 21:
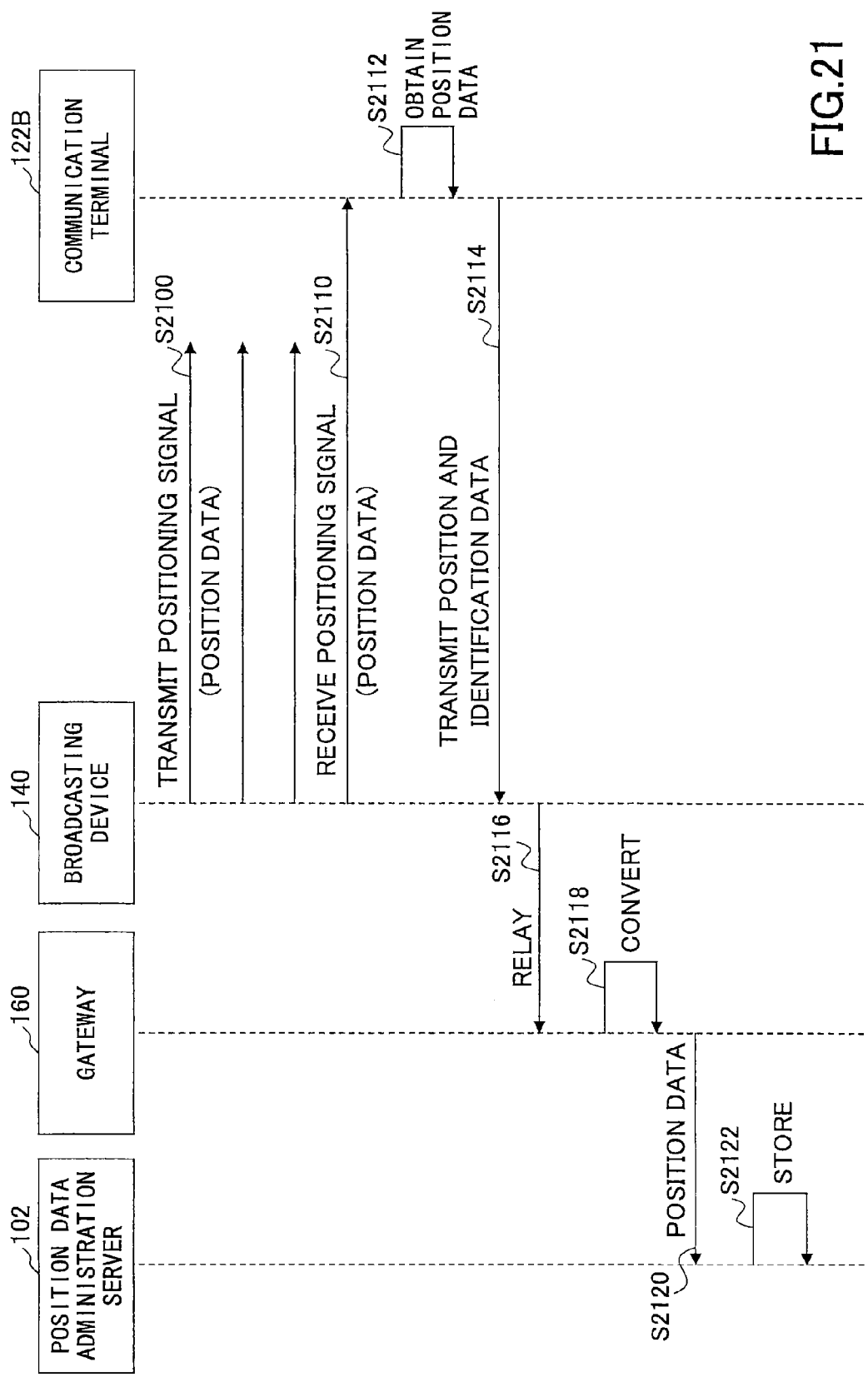
FIG. 21 is a sequence chart illustrating a process performed by a system according to an embodiment of this invention.

With reference to FIG. 21, the process for administrating the position data is explained, which is performed by the position data administration server 102, the gateway 160, the broadcasting device 140, and the communication terminal 122B. Unlike the example shown in FIG. 15, FIG. 21 shows an example in which the communication terminal 122B transmits the position data.

In Step S2100, the positionig signal transmitting unit 702 of the broadcasting device 140, which has the broadcast device identifier "C5", transmits the positioning signal including the following position data to a predetermined area.

Latitude "35.66635"
Longitude "139.76535"
Floor "4"

The position data transmitted by the broadcasting device 140 having the broadcasting device identifier "C5" is administrated by the table shown in FIG. 10 and stored in the control apparatus 100.

In Step S2110, the positioning signal receiving unit 704b of the communication terminal 122B receives the position signal transmitted by the positioning signal transmitting unit 702 of the broadcasting device 140 having the broadcasting device identifier "C5".

In Step S2112, the position data obtaining unit 706b of the communication terminal 122B obtains the position data from the received positioning signal. The position data is included in a predetermined field of a frame forming the positional signal according to the IMES standard. Here, the position data obtained by the communication terminal 122B is as follows.

Latitude "35.66635"
Longitude "139.76525"
Floor "4"

In Step S2114, the position data transmission unit 710b of the communication terminal 122B transmits to the broadcasting device 140 the above position data as well as the identification data stored in the identification data storage unit 708. Here, the identification data (i.e. MAC address) of the communication terminal 122B is as follows.

Identification data "002673abcd03"

In Step S2116, the relaying unit 712 of the broadcasting device 140 relays the position data and the identification data received from the communication terminal 122B to the gateway 160.

In Step S2118, the gateway 160 converts the data received from the network 180 to which the broadcasting device 140 is connected into the data which is suitable for the network 190 such as a LAN.

In Step S2120, the position data receiving unit 716 of the position data administration server 102 receives the position data and the identification data of the communication terminal 122B via the broadcasting device 140 and the gateway 160.

In Step S2122, the position data storage unit 718 of the position data administration server 102 stores the position data of the communication terminal 122B using the received identification data. Here, the date and time in which the position data administration server 102 receives the position data from the communication terminal 122B is also stored. In this example, the position data administration server 102 administrates the position data received from the communication terminal 122B using the position data administration table as shown in FIG. 20. In this example, the following data is stored.

Date and time "2012/7/17 10:05:30"
Latitude "35.66635"
Longitude "139.76525"
Floor "4"

With the above process, the position data administration server 102 according to this embodiment of this invention may administrate the position data of the wireless terminal 120 carried by the user and the information processing device 122A.

Figure 22:
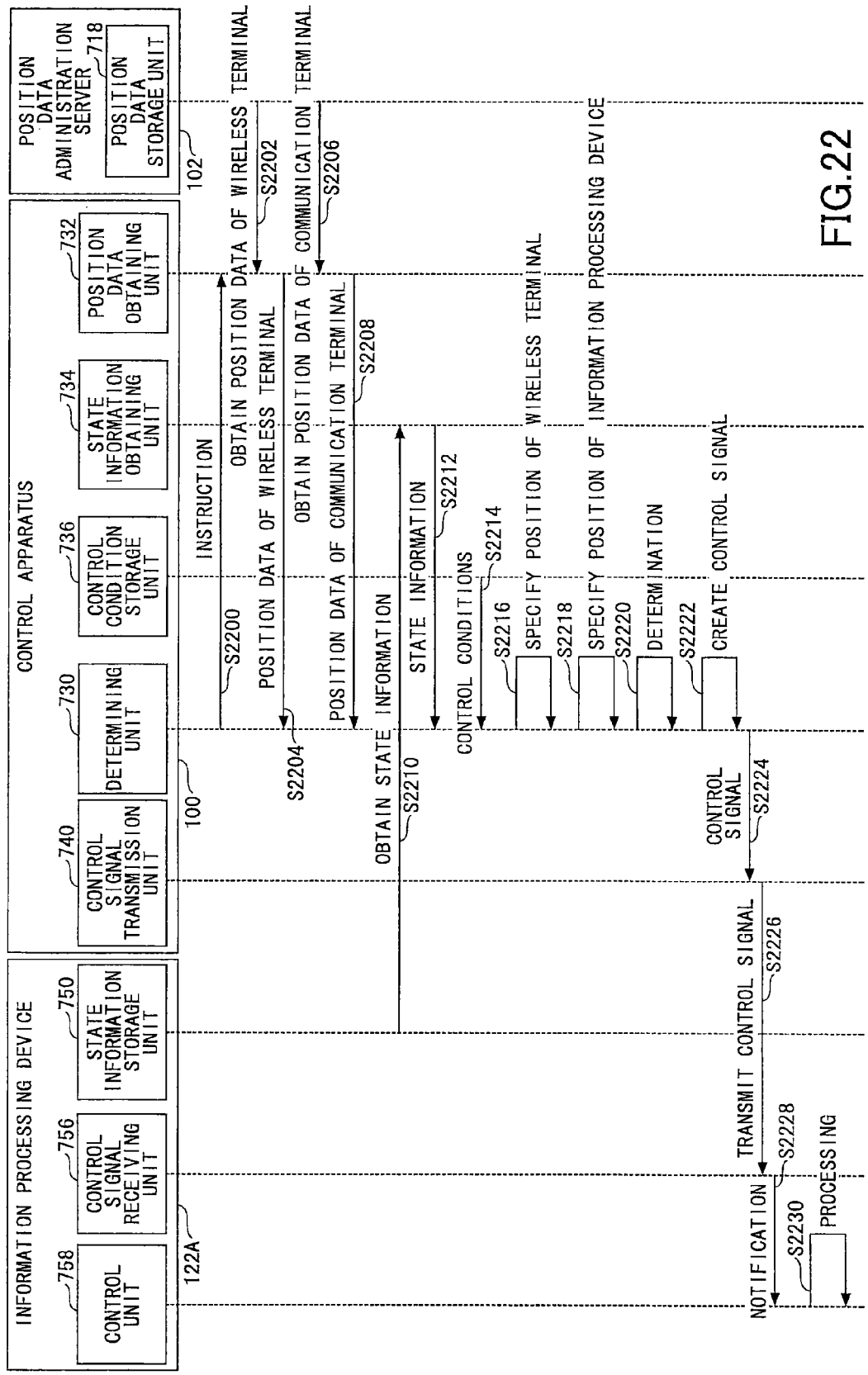
FIG. 22 is a sequence chart illustrating a process performed by a system according to an embodiment of this invention.

FIG. 22 shows the process performed by the control apparatus 100 to control the information processing device 122A according to the obtained data from the position data administration server 102 and the information processing device 122A.

In Step S2200, the determining unit 730 (the position specifying unit 733) of the control apparatus 100 instructs the position data obtaining unit 732 to obtain the position data of the wireless terminal 120 and the communication terminal 122B.

In Step S2202, the position data obtaining unit 732 of the control apparatus 100 obtains the position data of the wireless terminal 120 (the present position data and/or the history of the position data for a fixed period) from the position data storage unit 718 of the position data administration server 102. Here, the position data obtaining unit 732 obtains the position data from "2012/7/17 10:05:00" to "2012/7/17 10:05:30" stored in the position data administration table shown in FIG. 9A.

In Step S2204, the determining unit 730 (the position data loading unit 731) of the control apparatus 100 reads the position data of the wireless terminal 120 obtained in Step S2202.

In Step S2206, the position data obtaining unit 732 of the control apparatus 100 obtains the position data (the present position data and/or the history of the position data for a fixed period) of the communication terminal 122B (i.e. information processing device 122A) from the position data storage unit 718 of the position data administration server 102. For example, the position data from "2012/7/17 10:05:00" to "2012/7/17 10:05:30" included in the position data administration table shown in FIG. 20 is obtained.

In Step S2208, the determining unit 730 (the position data loading unit 731) of the control apparatus 100 reads the position data of the communication terminal 122B (i.e. the information processing device 122A) obtained in Step S2206.

Subsequent Steps S2210-S2230 for determining the processing based on the state information obtained from the information processing device 122A and the position data of the wireless terminal 120 and the information processing device 122A corresponds to Step S1610-S1630 as shown in FIG. 16.

With the above stated process, the control apparatus 100 according to this embodiment allows the information processing device 122A which does not have the positioning signal receiving unit to execute predetermined processing according to the control conditions.

CROSS-REFERENCE TO RELATED APPLICATIONS

The present application is based upon and claims the benefit of priority of Japanese Patent Application No. 2012-202650 filed on Sep. 14, 2012, and Japanese Patent Application No. 2013-182175 filed on Sep. 3, 2013, the entire contents of which are incorporated herein by reference.

PATENT DOCUMENT

[Patent Document 1] Japanese Patent No. 4296302

NON-PATENT DOCUMENT

[Non-patent Document 1] "Quasi-Zenith Satellite System Navigation Service Interface Specification for QZSS (IS-QZSS) V1.4", Japan Aerospace Exploration Agency

What is claimed is:

1. A control apparatus for communicating with a wireless terminal and an information processing device, the control apparatus comprising:
   circuitry configured to
      obtain position data of the wireless terminal,
      obtain state information about the information processing device,
      make a determination that the position data obtained indicates a predetermined location and the state information obtained indicates a predetermined state, and
      transmit to the information processing device a control signal causing the information processing device to execute predetermined processing in response to the determination made by the circuitry, the circuitry being configured to transmit different control signals causing the information processing device to execute different predetermined processing based on different combinations of position data and state information.

2. The control apparatus as claimed in claim 1, wherein the circuitry obtains present and past positional data of the wireless terminal, and determines that the present and past positional data obtained indicates the predetermined location.

3. The control apparatus as claimed in claim 1, wherein the circuitry further obtains position data of the information processing device, and determines that the position data of the wireless terminal obtained is identical with the position data of the information processing device obtained.

4. The control apparatus as claimed in claim 1, wherein the circuitry further obtains position data of the information processing device by obtaining the position data of a communication terminal associated with the information processing device.

5. The control apparatus as claimed in claim 1, wherein the state information represents either a lock state, a pending printing job state, or a standby state of the information processing device.

6. The control apparatus as claimed in claim 5, wherein the circuitry transmits to the information processing device the control signal to unlock the information processing device when the circuitry determines that the position data of the wireless terminal obtained indicates the predetermined location and the state information obtained indicates that the information processing device is locked.

7. The control apparatus as claimed in claim 5, wherein the circuitry transmits to the information processing device the control signal to lock the information processing device when the circuitry determines that the position data of the wireless terminal obtained indicates the predetermined location and the state information obtained indicates that the information processing device is unlocked.

8. The control apparatus as claimed in claim 5, wherein the circuitry transmits to the information processing device the control signal to execute a pending printing job when the circuitry determines that the position data of the wireless terminal obtained indicates the predetermined location and the state information obtained indicates that the pending printing job exists.

9. The control apparatus as claimed in claim 1, wherein the position data is expressed by latitude, longitude and floor information.

10. The control apparatus as claimed in claim 9, wherein the position data is broadcast through a positioning signal formed according to IMES standard.

11. The control apparatus as claimed in claim 1, wherein
   the circuitry transmits to the information processing device an unlock control signal to unlock the information processing device when the circuitry determines that the position data of the wireless terminal obtained indicates a first location and the state information obtained indicates that the information processing device is locked,
   the circuitry transmits to the information processing device a lock control signal to lock the information processing device when the circuitry determines that the position data of the wireless terminal obtained indicates the first location and the state information obtained indicates that the information processing device is unlocked, and
   the circuitry transmits to the information processing device a printing control signal to execute a pending printing job when the circuitry determines that the position data of the wireless terminal obtained indicates a second location different from the first location and the state information obtained indicates that the pending printing job exists.

12. A control method executed on a control apparatus for communicating with a wireless terminal and an information processing device, the method comprising:
   obtaining position data of the wireless terminal;
   obtaining state information about the information processing device;
   making a determination that the obtained position data indicates a predetermined location and the obtained state information obtained indicates a predetermined state; and
   transmitting to the information processing device a control signal causing the information processing device to execute predetermined processing in response to the determination, the transmitting transmits different control signals causing the information processing device to execute different predetermined processing based on different combinations of position data and state information.

13. A non-transitory computer-readable recording medium having stored therein a control program for a control apparatus for communicating with a wireless terminal and an information processing device, the control program causing the control apparatus to execute a method, the method comprising:
   obtaining position data of the wireless terminal;
   obtaining state information about the information processing device;

making a determination that the obtained position data indicates a predetermined location and the obtained state information obtained indicates a predetermined state; and transmitting to the information processing device a control signal causing the information processing device to execute predetermined processing in response to the determination, the transmitting transmits different control signals causing the information processing device to execute different predetermined processing based on different combinations of position data and state information.

\* \* \* \* \*